US012356233B2

United States Patent
Manolakos et al.

(10) Patent No.: US 12,356,233 B2
(45) Date of Patent: Jul. 8, 2025

(54) MEASUREMENT CONFIGURATION FOR DOPPLER SHIFT REPORTING

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/997,916

(22) PCT Filed: Jan. 8, 2021

(86) PCT No.: PCT/CN2021/070833
§ 371 (c)(1),
(2) Date: Nov. 3, 2022

(87) PCT Pub. No.: WO2021/248907
PCT Pub. Date: Dec. 16, 2021

(65) Prior Publication Data
US 2023/0141785 A1    May 11, 2023

(30) Foreign Application Priority Data

Jun. 12, 2020   (WO) ................ PCT/CN2020/095741

(51) Int. Cl.
*H04W 24/10*  (2009.01)
*H04B 17/309*  (2015.01)

(52) U.S. Cl.
CPC .......... *H04W 24/10* (2013.01); *H04B 17/309* (2015.01)

(58) Field of Classification Search
CPC .... G01S 5/0036; G01S 5/0244; G01S 5/0246; H04B 17/309; H04W 24/02; H04W 24/10
See application file for complete search history.

(56) References Cited

U.S. PATENT DOCUMENTS

| 10,637,709 B2 | 4/2020 | Bai et al. |
| 10,708,796 B2 | 7/2020 | Sun et al. |

(Continued)

FOREIGN PATENT DOCUMENTS

| CN | 109392144 A | 2/2019 |
| CN | 109511128 A | 3/2019 |

(Continued)

OTHER PUBLICATIONS

Intel Corporation: "Corrections to QCL for NR", 3GPP TSG RAN WG1 Meeting #92bis, Tdoc: R1-1804724, Sanya, China, Apr. 16, 2018-Apr. 20, 2018, 3 Pages, Apr. 20, 2018 (Apr. 20, 2018), the whole document.

(Continued)

*Primary Examiner* — Timothy X Pham
(74) *Attorney, Agent, or Firm* — Holland & Hart LLP

(57) ABSTRACT

Methods, systems, and devices for wireless communications are described. In some wireless communications systems, signaling may be impacted by Doppler shifts associated with communications between a user equipment (UE) and one or more devices in the system. To account for the Doppler shifts, the UE may receive a Doppler shift measurement configuration to use for estimating one or more Doppler shift parameters associated with one or more reference signals transmitted from the one or more transmission reception points (TRPs). The measurement configuration may include a measurement restriction parameter which indicates a number of durations that the UE may use to estimate the Doppler shift parameters. The UE may generate and transmit a measurement report for the estimated Doppler shift param- (Continued)

eters according to a determined reporting accuracy and granularity.

30 Claims, 18 Drawing Sheets

(56) References Cited

U.S. PATENT DOCUMENTS

| | | | |
|---|---|---|---|
| 2012/0315915 A1* | 12/2012 | Ohm | H04W 36/08 455/436 |
| 2014/0185465 A1 | 7/2014 | Balachandran et al. | |
| 2016/0211959 A1 | 7/2016 | Jongren et al. | |
| 2018/0083680 A1 | 3/2018 | Guo et al. | |
| 2018/0183554 A1* | 6/2018 | Lim | H04L 5/005 |
| 2019/0141555 A1 | 5/2019 | Tooher et al. | |
| 2019/0379431 A1 | 12/2019 | Park et al. | |
| 2022/0173799 A1* | 6/2022 | Wigard | H04B 7/18513 |

FOREIGN PATENT DOCUMENTS

| | | |
|---|---|---|
| CN | 109845137 A | 6/2019 |
| CN | 110178346 | 8/2019 |
| CN | 110661676 A | 1/2020 |
| CN | 111096023 A | 5/2020 |
| CN | 111106916 A | 5/2020 |
| WO | 2017184278 A1 | 10/2017 |
| WO | WO-2018132199 | 7/2018 |
| WO | 2020032855 A1 | 2/2020 |

OTHER PUBLICATIONS

International Search Report and Written Opinion—PCT/CN2020/095741—ISA/EPO—Mar. 10, 2021 (205111WO1).
International Search Report and Written Opinion—PCT/CN2021/070833—ISA/EPO—Mar. 22, 2021 (205111WO2).
Lenovo, et al., "Remaining Issues on QCL", 3GPP TSG RAN WG1 Meeting #93, R1-1806342 QCL Final, 3rd Generation Partnership Project, Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, 3 Pages, XP051441547, 2.2 QCL for CSI-RS.
Samsung: "Summary Of Email Discussion for Rel. 17 Enhancements on MIMO for NR", 3GPP TSG RAN Meeting #86, RP-192435, 3rd Generation Partnership Project, Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 3, 2019, 31 Pages, XP051835464, CMCC contribution, p. 6-p. 7.
Supplementary European Search Report—EP21822691—Search Authority—Munich—May 28, 2024 (205111EP).

\* cited by examiner

MEASUREMENT CONFIGURATION FOR DOPPLER SHIFT REPORTING

CROSS REFERENCE

The present application is a 371 national stage filing of International PCT Application No. PCT/CN2021/070833 by Manolakos et al. entitled "MEASUREMENT CONFIGURATION FOR DOPPLER SHIFT REPORTING," filed Jan. 8, 2021; and claims priority to International Application No. PCT/CN2020/095741 by Manolakos et al., entitled "MEASUREMENT CONFIGURATION FOR DOPPLER SHIFT REPORTING," filed Jun. 12, 2020, each of which is assigned to the assignee hereof, and each of which is expressly incorporated by reference in its entirety herein.

FIELD OF TECHNOLOGY

The following relates generally to wireless communications and more specifically to measurement configuration for Doppler shift reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

The movement of a UE while communicating with one or more base stations or network access nodes may impact the signaling performance in a wireless communications system. For example, a UE traveling at high speeds may experience signal propagation effects such a Doppler shift.

SUMMARY

The described techniques relate to improved methods, systems, devices, and apparatuses that support measurement configuration for Doppler shift reporting. Generally, the described techniques provide for increasing signaling quality in a wireless communications network experiencing Doppler shift (e.g., related to high speed movement of a user equipment (UE)). In some examples, Doppler shifts associated with transmissions in the network may affect the ability of the UE to identify and combine reference signals transmitted from one or more network access nodes such as base stations or transmission reception points (TRPs), for example, in cases that the measured Doppler shift is different for each TRP. Thus, to reduce the effects of Doppler shift for the high-speed communications, the UE may measure and report Doppler shift parameters for each of the TRPs, and each TRP may adjust ongoing (e.g., current or future) communications to compensate for the reported Doppler shift.

The UE may receive a Doppler shift measurement configuration to use for estimating Doppler shift parameters associated with one or more reference signals transmitted from the one or more TRPs. The measurement configuration may include a measurement restriction parameter, such as a time restriction parameter, which indicates a number of time durations that the UE may use to estimate the Doppler shift parameters. For example, the UE may determine that the duration of time specified in the measurement restriction parameters includes a set of reference signals. In one example, the UE may estimate the Doppler shift parameters over the single time duration (e.g., a single "shot") or the UE may average a number of estimated Doppler shift parameters over multiple instances of the time duration (e.g., multiple "shots") in accordance with the measurement restriction parameter. The UE may generate and transmit a measurement report (e.g., a channel state information (CSI) report) using the estimated Doppler shift parameters, and may transmit the measurement report to the one or more TRPs of the system. Upon receiving the measurement report from the UE, the one or more TRPs may adjust communications for the UE to account for the reported Doppler shift.

A method of wireless communications at a UE is described. The method may include receiving a measurement configuration for estimating one or more Doppler shift parameters associated with a set of reference signals transmitted from one or more nodes, identifying, based on the measurement configuration, a measurement restriction parameter that indicates a number of time durations over which the UE is configured to measure for estimating the one or more Doppler shift parameters, where each time duration of the number of time durations includes a set of the set of reference signals, and transmitting a measurement report indicating an estimated one or more Doppler shift parameters associated with the set of reference signals to the one or more nodes in accordance with the measurement restriction parameter.

An apparatus for wireless communications at a UE is described. The apparatus may include a processor, memory coupled with the processor, and instructions stored in the memory. The instructions may be executable by the processor to cause the apparatus to receive a measurement configuration for estimating one or more Doppler shift parameters associated with a set of reference signals transmitted from one or more nodes, identify, based on the measurement configuration, a measurement restriction parameter that indicates a number of time durations over which the UE is configured to measure for estimating the one or more Doppler shift parameters, where each time duration of the number of time durations includes a set of the set of reference signals, and transmit a measurement report indicating an estimated one or more Doppler shift parameters associated with the set of reference signals to the one or more nodes in accordance with the measurement restriction parameter.

Another apparatus for wireless communications at a UE is described. The apparatus may include means for receiving a measurement configuration for estimating one or more Doppler shift parameters associated with a set of reference signals transmitted from one or more nodes, identifying, based on the measurement configuration, a measurement restriction parameter that indicates a number of time durations over which the UE is configured to measure for estimating the one or more Doppler shift parameters, where each time duration of the number of time durations includes a set of the set of reference signals, and transmitting a measurement report indicating an estimated one or more Doppler shift parameters associated with the set of reference signals to the one or more nodes in accordance with the measurement restriction parameter.

A non-transitory computer-readable medium storing code for wireless communications at a UE is described. The code may include instructions executable by a processor to receive a measurement configuration for estimating one or more Doppler shift parameters associated with a set of reference signals transmitted from one or more nodes, identify, based on the measurement configuration, a measurement restriction parameter that indicates a number of time durations over which the UE is configured to measure for estimating the one or more Doppler shift parameters, where each time duration of the number of time durations includes a set of the set of reference signals, and transmit a measurement report indicating an estimated one or more Doppler shift parameters associated with the set of reference signals to the one or more nodes in accordance with the measurement restriction parameter.

Some examples of the method, apparatuses, and non-transitory computer-readable medium described herein may further include operations, features, means, or instructions for identifying a measurement accuracy for estimating the one or more Doppler shift parameters, where the measurement accuracy may be based on the measurement restriction parameter.

In some examples of the method, apparatuses, and non-transitory computer-readable medium described herein, identifying a measurement accuracy further may include operations, features, means, or instructions for determining the measurement restriction parameter indicates a number of time durations, where the measurement accuracy may be based on whether the number of time durations comprises more than a single time duration.

Some examples of the method, apparatuses, and non-transitory computer-readable medium described herein may further include operations, features, means, or instructions for identifying a measurement accuracy for estimating the one or more Doppler shift parameters based on a transmission timing structure for the set of reference signals.

Some examples of the method, apparatuses, and non-transitory computer-readable medium described herein may further include operations, features, means, or instructions for identifying a measurement accuracy for estimating the one or more Doppler shift parameters based on a reference signal type associated with the set of reference signals.

Some examples of the method, apparatuses, and non-transitory computer-readable medium described herein may further include operations, features, means, or instructions for determining the number of time durations includes a single time duration corresponding to a single configured group of the set of reference signals, and determining the estimated one or more Doppler shift parameters based on a measurement over the single time duration of a Doppler shift associated with the single configured group of the set of reference signals.

Some examples of the method, apparatuses, and non-transitory computer-readable medium described herein may further include operations, features, means, or instructions for determining the number of time durations includes a set of multiple time durations corresponding to a set of configured groups of the set of reference signals, estimating a Doppler shift value based on a measurement over each time duration of the set of multiple time durations, and determining the estimated one or more Doppler shift parameters based on averaging Doppler shift values associated with the set of multiple time durations.

In some examples of the method, apparatuses, and non-transitory computer-readable medium described herein, the measurement restriction parameter indicates one or more slots over which the UE may be configured to measure for estimating the one or more Doppler shift parameters.

Some examples of the method, apparatuses, and non-transitory computer-readable medium described herein may further include operations, features, means, or instructions for identifying a range of resolvable Doppler shift values, and estimating the one or more Doppler shift parameters in accordance with the range of resolvable Doppler shift values.

In some examples of the method, apparatuses, and non-transitory computer-readable medium described herein, identifying the range of resolvable Doppler shift values further may include operations, features, means, or instructions for identifying a time-domain gap between consecutive samples of the set of reference signals.

In some examples of the method, apparatuses, and non-transitory computer-readable medium described herein, identifying the range of resolvable Doppler shift values further may include operations, features, means, or instructions for receiving a downlink message that indicates the range of resolvable Doppler shift values.

Some examples of the method, apparatuses, and non-transitory computer-readable medium described herein may further include operations, features, means, or instructions for generating the measurement report including a first indication of the estimated one or more Doppler shift parameters and a second indication of the range of resolvable Doppler shift values.

Some examples of the method, apparatuses, and non-transitory computer-readable medium described herein may further include operations, features, means, or instructions for identifying a number of bits allocated for reporting the one or more Doppler shift parameters, and determining a granularity for reporting the one or more Doppler shift parameters based on the range of resolvable Doppler shift values and the number of bits.

Some examples of the method, apparatuses, and non-transitory computer-readable medium described herein may further include operations, features, means, or instructions for determining a granularity for reporting the one or more Doppler shift parameters based on the number of time durations over which the UE may be configured to use for estimating the one or more Doppler shift parameters.

In some examples of the method, apparatuses, and non-transitory computer-readable medium described herein, transmitting the measurement report further may include operations, features, means, or instructions for identifying a set of bins associated with one or more Doppler shift values, identifying a numerical value representative of the estimated one or more Doppler shift parameters, and allocating the estimated one or more Doppler shift parameters to a bin of the set of bins based on the numerical value.

Some examples of the method, apparatuses, and non-transitory computer-readable medium described herein may further include operations, features, means, or instructions for determining the set of bins includes a first bin associated with Doppler shift values that may be less than a threshold value, and a second bin associated with Doppler shift values that exceed the threshold value.

In some examples of the method, apparatuses, and non-transitory computer-readable medium described herein, the estimated one or more Doppler shift parameters may be quantized based on the numerical value.

In some examples of the method, apparatuses, and non-transitory computer-readable medium described herein, transmitting the measurement report further may include operations, features, means, or instructions for generating a bit that indicates the estimated one or more Doppler shift parameters as having a positive or negative value.

Some examples of the method, apparatuses, and non-transitory computer-readable medium described herein may further include operations, features, means, or instructions for identifying a time-domain overlap between a first channel state information report including the measurement report and a second channel state information report, and determining a prioritization for the first channel state information report and the second channel state information report based on a composition of the first channel state information report and a composition of the second channel state information report.

In some examples of the method, apparatuses, and non-transitory computer-readable medium described herein, the composition includes at least one of beam reporting information, Doppler reporting information, or channel quality information reporting.

In some examples of the method, apparatuses, and non-transitory computer-readable medium described herein, the prioritization may be further based on a reference signal identifier, a control resource set identifier, or a quasi-co location information identifier associated with the measurement report.

In some examples of the method, apparatuses, and non-transitory computer-readable medium described herein, the number of time durations correspond to allocated time for monitoring a group of configured reference signals.

In some examples of the method, apparatuses, and non-transitory computer-readable medium described herein, the number of time durations include one or more slots.

In some examples of the method, apparatuses, and non-transitory computer-readable medium described herein, transmitting the measurement report to the one or more nodes further may include operations, features, means, or instructions for generating a first indicator associated with a first Doppler shift estimation parameter for a first transmission reception point (TRP), generating second indicator associated with a second Doppler shift estimation parameter for a second TRP, and transmitting the measurement report including the first indicator and the first Doppler shift estimation parameter and the second indicator and the second Doppler shift estimation parameter.

In some examples of the method, apparatuses, and non-transitory computer-readable medium described herein, the first indicator and the second indicator include different control resource set pool indices or transmission configuration indicator states.

A method of wireless communications at a base station is described. The method may include identifying a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmitting, to the UE, a measurement configuration message including the measurement restriction parameter for estimating the one or more Doppler shift parameters, and receiving, from the UE, a measurement report indicating an estimated one or more Doppler shift parameters associated with the set of reference signals in accordance with the measurement restriction parameter.

An apparatus for wireless communications at a base station is described. The apparatus may include a processor, memory coupled with the processor, and instructions stored in the memory. The instructions may be executable by the processor to cause the apparatus to identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmit, to the UE, a measurement configuration message including the measurement restriction parameter for estimating the one or more Doppler shift parameters, and receive, from the UE, a measurement report indicating an estimated one or more Doppler shift parameters associated with the set of reference signals in accordance with the measurement restriction parameter.

Another apparatus for wireless communications at a base station is described. The apparatus may include means for identifying a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmitting, to the UE, a measurement configuration message including the measurement restriction parameter for estimating the one or more Doppler shift parameters, and receiving, from the UE, a measurement report indicating an estimated one or more Doppler shift parameters associated with the set of reference signals in accordance with the measurement restriction parameter.

A non-transitory computer-readable medium storing code for wireless communications at a base station is described. The code may include instructions executable by a processor to identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmit, to the UE, a measurement configuration message including the measurement restriction parameter for estimating the one or more Doppler shift parameters, and receive, from the UE, a measurement report indicating an estimated one or more Doppler shift parameters associated with the set of reference signals in accordance with the measurement restriction parameter.

Some examples of the method, apparatuses, and non-transitory computer-readable medium described herein may further include operations, features, means, or instructions for identifying a measurement accuracy for estimating the one or more Doppler shift parameters, where the measurement accuracy may be based on the measurement restriction parameter.

In some examples of the method, apparatuses, and non-transitory computer-readable medium described herein, identifying a measurement accuracy further may include operations, features, means, or instructions for determining the measurement restriction parameter indicates a number of time durations, where the measurement accuracy may be based on whether the number of time durations comprises more than a single time duration.

Some examples of the method, apparatuses, and non-transitory computer-readable medium described herein may further include operations, features, means, or instructions for identifying a measurement accuracy for estimating the one or more Doppler shift parameters based on a transmission timing structure for the set of reference signals.

Some examples of the method, apparatuses, and non-transitory computer-readable medium described herein may further include operations, features, means, or instructions for identifying a measurement accuracy for estimating the one or more Doppler shift parameters based on a reference signal type associated with the set of reference signals.

Some examples of the method, apparatuses, and non-transitory computer-readable medium described herein may further include operations, features, means, or instructions for determining the number of time durations includes a single time duration corresponding to a single configured group of the set of reference signals, where the measurement report may be based on a measurement over the single time duration of the one or more Doppler shift parameters associated with the single configured group of the set of reference signals.

Some examples of the method, apparatuses, and non-transitory computer-readable medium described herein may further include operations, features, means, or instructions for determining the number of time durations includes a set of multiple time durations corresponding to a set of configured groups of the set of reference signals, where the measurement report includes a Doppler shift value that may be estimated based on an average measurement over each time duration of the set of multiple time durations.

In some examples of the method, apparatuses, and non-transitory computer-readable medium described herein, the measurement restriction parameter indicates one or more slots over which the UE may be configured to measure for estimating the one or more Doppler shift parameters.

Some examples of the method, apparatuses, and non-transitory computer-readable medium described herein may further include operations, features, means, or instructions for identifying a time-domain overlap between a first channel state information report including the measurement report and a second channel state information report, and transmitting an indication of a prioritization for the first channel state information report and the second channel state information report based on a composition of the first channel state information report and a composition of the second channel state information report.

In some examples of the method, apparatuses, and non-transitory computer-readable medium described herein, the composition includes at least one of beam reporting information, Doppler reporting information, or channel quality information reporting.

In some examples of the method, apparatuses, and non-transitory computer-readable medium described herein, the prioritization may be further based on a reference signal identifier, a control resource set identifier, or a quasi-co location information identifier associated with the measurement report.

In some examples of the method, apparatuses, and non-transitory computer-readable medium described herein, the number of time durations correspond to allocated time for monitoring a group of configured reference signals.

In some examples of the method, apparatuses, and non-transitory computer-readable medium described herein, the number of time durations include one or more slots.

DETAILED DESCRIPTION

Figure 1:
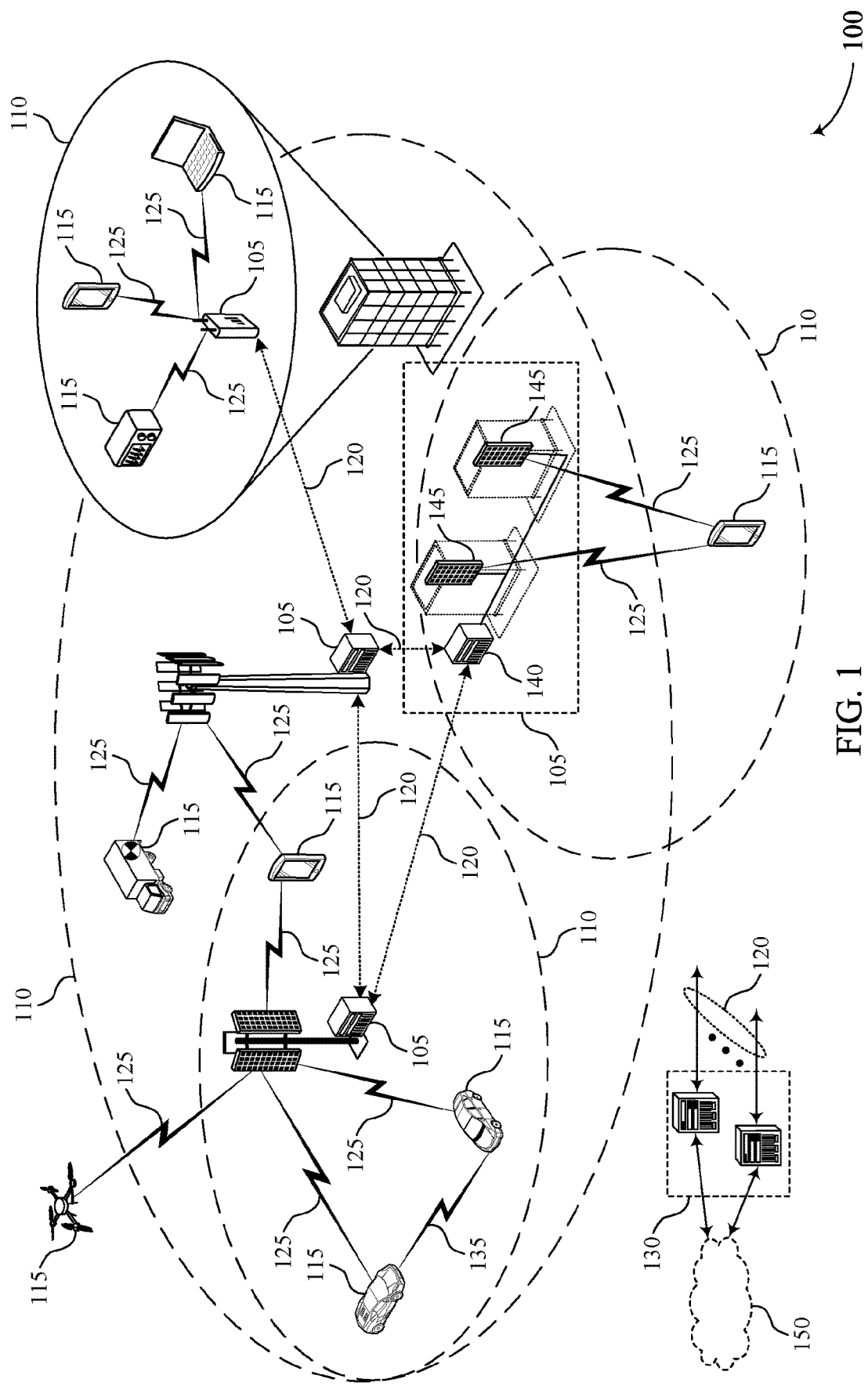
FIG. 1 illustrates an example of a system for wireless communications that supports measurement configuration for Doppler shift reporting in accordance with aspects of the present disclosure.

In some wireless communications systems (e.g., 5G/new radio (NR) communications systems) a user equipment (UE) may support signaling between multiple transmission reception points (TRPs) in a single frequency network (SFN). In some cases, the UE may travel at high speeds (e.g., on a high speed train (HST) or other high speed transit) and experience Doppler shifts that affect both uplink and downlink communications at the UE, while reducing overall communications quality. For example, Doppler shifts associated with downlink transmissions may affect the ability of the UE to identify and combine reference signals transmitted from TRPs in the system, especially if the measured Doppler shift is different for each TRP. Thus, to reduce the effects of Doppler shift for the high speed communications, the UE may measure and report Doppler shift parameters for each of the TRPs, and each TRP may adjust ongoing communications to compensate for the reported Doppler shift.

To improve the reliability and quality of the communications, the UE may identify a Doppler shift measurement configuration to use for measuring and reporting various Doppler shift parameters to one or more TRPs in an SFN. The UE may receive the measurement configuration from one or more TRPs which includes a measurement restriction parameter that indicates a number of time durations that the UE may use to estimate Doppler shift. For example, the TRPs may transmit a number of reference signals, and the UE determines a duration of time that it may use to estimate Doppler shift, where the duration of time contains one or more of the transmitted reference signals in accordance with the measurement restriction parameter. The measurement configuration and the measurement restriction parameter may be based on the reference signal structure of transmitted reference signals from the one or more TRPs.

In one example, the UE may estimate the Doppler shift parameters over the single time duration (e.g., a single "shot") or the UE may average a number of estimated Doppler shift parameters over multiple instances of the time duration (e.g., multiple "shots") in accordance with the measurement restriction parameter. The UE may report the estimated Doppler shift parameters in an uplink message (e.g., uplink control information (UCI), channel status information (CSI), etc.) to the TRPs along with an identifier (such as a control resource set (CORESET) ID or a transmission configuration (TCI) state) that indicates which Doppler shift measurements correspond to which TRP.

In some examples, the UE may determine an accuracy requirement for estimating the Doppler shift parameters based on the measurement configuration (e.g., based on whether single shot or multiple shot measurement was configured). The UE may also determine a granularity for reporting the Doppler shift, for example, the UE may allocate Doppler shift values to various bins according to a range of Doppler shift values or the reported Doppler shift being above or below a determined threshold Doppler shift value. In some other examples, the Doppler shift report may indicate the sign of the Doppler shift (e.g., whether the UE is moving towards or away from the TRP).

Aspects of the disclosure are initially described in the context of wireless communications systems. For example, aspects of the disclosure may be described in the context of multi-TRP communications in a SFN. Aspects of the disclosure are further illustrated by and described with reference to apparatus diagrams, system diagrams, process flow diagrams, tracking reference signal configurations, example reference signal structures, and flowcharts that relate to measurement configuration for Doppler shift reporting.

FIG. 1 illustrates an example of a wireless communications system 100 that supports measurement configuration for Doppler shift reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, backhaul links 120 may be ideal backhaul links, which may support communications such as single downlink control information (DCI) multi-TRP operations, in which different physical downlink shared channel (PDSCH) schemes such as spatial division multiplexing (SDM), time division multiplexing (TDM), and frequency division multiplexing (FDM) are supported. In some other examples, the backhaul links 120 may be non-ideal, which may support communication such as multi-DCI multi-TRP operations, in which carrier aggregation framework may be used such that different TRPs are configured as different virtual component carriers from the perspective of a UE 115.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

In some examples, wireless communication system 100 may support multi-TRP configurations for different frequency bands (e.g., FR1, FR2, etc.). Wireless devices in wireless communications system 100 such as base stations 105 and UEs 115 may increase channel reliability and robustness for various channels including PDSCH, PDCCH, PUSCH, and physical uplink control channel (PUCCH) using such multi-TRP or multi-panel configurations. In some examples, a wireless device may identify and specify other system aspects such as quasi-co location (QCL) transmission configuration indicator (TCI) related enhancements to enable inter-cell multi-TRP operations, for example, in cases where the wireless communication system 100 supports multi-DCI based multi-PDSCH reception. In addition, a wireless device may evaluate or specify various beam-management-related processes for simultaneous multi-TRP transmission with multi-panel reception.

In addition, some wireless communications systems 100 may be examples of high speed train (HST) deployments, which may operate using an SFN configuration. In such cases, the wireless communications system 100 may support various QCL assumptions for downlink modulation reference signaling (DMRS) (e.g., multiple QCL assumptions for the same DMRS port(s), targeting DL-only transmission). In addition, the wireless communications system 100 may support a QCL relations (or a QCL-like relation) between downlink and uplink signals by reusing the TCI signaling framework.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In some examples, the MAC layer may configure transmissions using a MAC control element (CE), which may indicate control information. For example, a MAC-CE may be used to map active TCI states to DCI codepoints (e.g., MAC-CE may activate TCI states and maps one or more of the TCI states to a DCI codepoint). In such cases, the number of bits (e.g., three bits) may be used for indicating the TCI field in the DCI, and the TCI field may indicate one or more TCI states In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems 100 may support signaling between a UE 115 multiple TRPs or base stations 105 that are configured as a SFN. In some cases, the UE 115 may travel at high speeds such as on an HST, and may experience Doppler shifts that affect both uplink and downlink communications at the UE 115. For example, Doppler shifts associated with the downlink transmissions may affect the ability of the UE 115 to identify and combine reference signals transmitted from TRPs in the system, especially if the measured Doppler shifts are different for each TRP. Thus, to reduce the effects of Doppler shift for the high speed communications, the UE 115 may measure and report Doppler shift parameters for each of the TRPs, and each TRP may adjust ongoing communications to compensate for the reported Doppler shift.

The UE 115 may identify a Doppler shift measurement configuration to use in measuring and reporting various Doppler shift parameters to one or more TRPs. The UE 115 may receive the measurement configuration from one or more TRPs which includes a measurement restriction parameter that indicates a number of time durations that the UE 115 may use to estimate Doppler shift. For example, the TRPs may transmit a number of reference signals, and the UE 115 determines a duration of time that it may use to estimate Doppler shift, where the duration of time contains one or more of the transmitted reference signals in accordance with the measurement restriction parameter. In one example, the UE 115 may estimate the Doppler shift parameters over the single time duration (e.g., a single "shot") or the UE may average a number of estimated Doppler shift parameters over multiple instances of the time duration (e.g., multiple "shots") in accordance with the measurement restriction parameter.

In some examples, the UE 115 may adapt how it measures the Doppler shift parameters based on an accuracy target or a measurement granularity for reporting the Doppler shift. For example, the UE 115 may allocate Doppler shift values to various bins according to a range of Doppler shift values or the reported Doppler shift being above or below a determined threshold Doppler shift value, or may allocate Doppler shift measurements to bins based on the determined sign of the Doppler shifts (e.g., positive or negative, depending of the direction of travel of the UE relative to a TRP).

Figure 2:
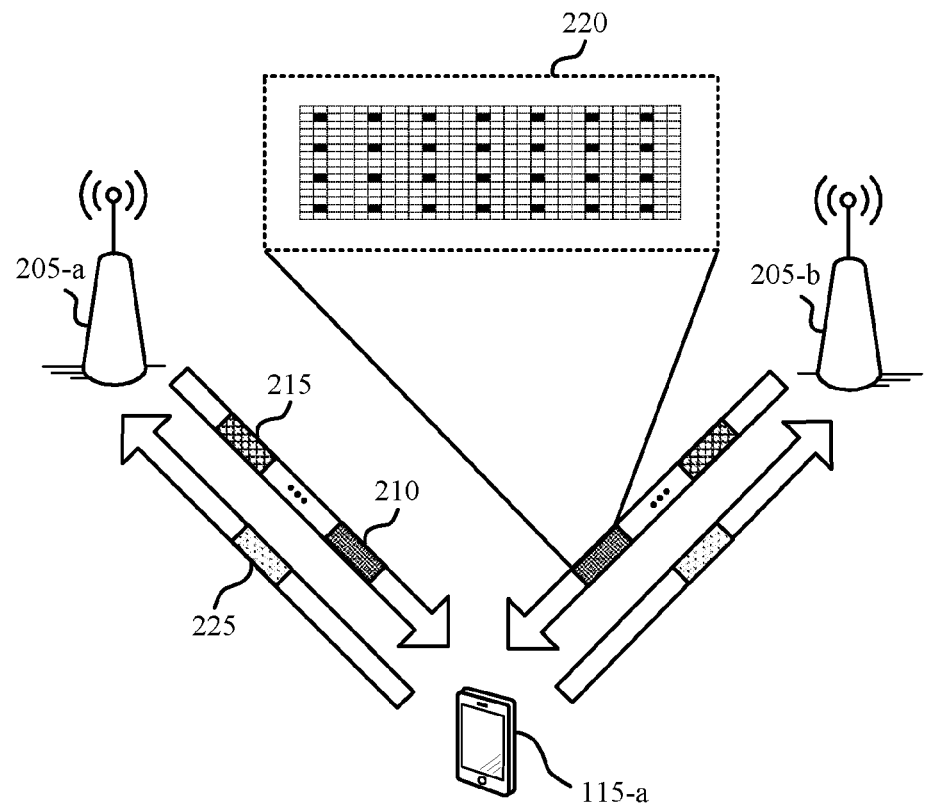
FIG. 2 illustrates an example of a wireless communications system that supports measurement configuration for Doppler shift reporting in accordance with aspects of the present disclosure.

FIG. 2 illustrates an example of a wireless communications system 200 that supports measurement configuration for Doppler shift reporting in accordance with aspects of the present disclosure. In some examples, wireless communications system 200 may implement aspects of wireless communications system 100. The wireless communications system 200 may include a UE 115-a, which may be an example of a UE 115 as described with reference to FIG. 1. Additionally, the wireless communications system 200 may include TRPs 205-a and 205-b, which may be examples of base stations 105 or access network transmission entities 145 as described with reference to FIG. 1. In some examples, the UE 115-a may be configured to communicate with multiple TRPs, for example, the UE 115-a may support communications in a multi-TRP network configuration.

The UE 115-a may be in communication with a serving cell via the first TRP 205-a and the second TRP 205-b. In some cases, the UE 115-a may be in communication with additional TRPs 205 associated with the serving cell in an SFN deployment. The UE 115-a may receive one or more indications (e.g., via RRC signaling, MAC-CE signaling, DCI) associated with receiving downlink transmissions from the TRPs 205-a and 205-b. For example, the UE 115-a may be configured to support multi-TRP operation for the serving cell, in which the UE 115-a may operate according to a single-DCI based mode or a multi-DCI based mode (e.g., based in part on an ideal or non-ideal backhaul configuration) for the multi-TRP operation.

In some implementations, the UE 115-a may support wireless communications during high speed travel (e.g., on a HST or other high speed deployments). In some cases, however, uplink and downlink signaling at the UE 115-*a* may experience Doppler shifts that affect the signaling quality and reliability between the UE 115-*a* and the TRPs 205. For example, Doppler shifts associated with the downlink transmissions may affect the ability of the UE 115-*a* to identify and combine reference signals transmitted from TRPs 205-*a* and 205-*b*, especially if the measured Doppler shift is different for each TRP 205. Thus, to reduce the effects of the Doppler shift, the UE 115-*a* may measure and report Doppler shift parameters for each of the TRPs 205-*a* and 205-*b* such that each TRP may adjust ongoing communications to compensate for the reported Doppler shift.

In some examples, the UE 115-*a* may be capable of estimating various Doppler parameters or metrics associated with the different channels between the UE 115-*a* and the TRPs 205 (e.g., the channel between the UE 115-*a* and the TRP 205-*a* and the channel between the UE 115-*a* and the TRP 205-*b*). The UE 115-*a* may receive a measurement configuration message 210 (e.g., via DCI or other control signaling) associated with measuring one or more reference signals transmitted from one or more TRPs 205. In some examples, the measurement configuration 210 may be a channel state information (CSI) report configuration (e.g., CSIreport-Config) that may indicate a number of parameters that the UE 115-*a* may include in a measurement report 225 to send to the one or more TRPs. In addition, the measurement report 225 may configure a periodic or semi-periodic report sent by the UE 115-*a* on an uplink channel (e.g., PUCCH, PUSCH, etc.) of the serving cell.

In some cases, the measurement configuration 210 may include a measurement restriction parameter 220 such as a time restriction parameter (e.g., timeRestrictionForChannelMeasurement) that indicates a number of time durations that the UE 115-*a* may use to estimate and report the measured Doppler shift. In such cases, a time duration may be a period of time (e.g., one or more slots) or a set of reference signals that the UE 115-*a* may use for measuring Doppler shift.

The measurement restriction parameter 220 may indicate different measurement configurations that the UE 115-*a* may implement for measuring Doppler shift. In one example, the measurement restriction parameter 220 may include an integer value that corresponds to a number of time durations or slots that the UE 115-*a* may use to estimate the Doppler shift parameters. In some other examples, the measurement restriction parameter 220 may be configured for Doppler measurements by the UE 115-*a* (e.g., the value of the measurement restriction parameter 220 is "configured"), and the UE 115-*a* may measure the Doppler shift in accordance with a time restriction (e.g., TimeRestriction is configured). In cases that the UE 115-*a* determines that the time restriction is configured, the UE 115-*a* may measure the Doppler shift over a single time duration. For example, the UE 115-*a* may measure the Doppler shift over a single "shot," corresponding to a single time duration or a single configured set of reference signals. In such cases, the UE 115-*a* may measure Doppler shift parameters associated with the transmitted reference signals in the single time duration, and may use the value measured over the single "shot" to generate the measurement report 225.

In some other cases, the UE 115-*a* may determine that the time restriction is not configured, and the UE 115-*a* may measure the Doppler shift over multiple time durations. For example, the UE 115-*a* may be configured to measure multiple "shots," corresponding to multiple time durations or multiple configured sets of reference signals. In such cases, the UE 115-*a* may measure Doppler shift parameters associated with the transmitted reference signals over the multiple time durations, and the UE 115-*a* may perform Doppler shift estimation averaging (e.g., the UE 115-*a* may compute an average of the measured Doppler shift parameters over the multiple time durations) and may use the averaged measured Doppler shift value to generate the measurement report 225. In some cases, by performing a "multi-shot" measurement of the Doppler shift parameters, the UE 115-*a* may use pervious reference signal Doppler shift measurements to increase the measured Doppler shift accuracy.

In some implementations, the UE 115-*a* may identify a measurement accuracy target for estimation of the Doppler shift parameters. The measurement accuracy target may be configured by the wireless communications network 200 or may be indicated to the UE 115-*a* by the one or more TRPs 205. The measurement accuracy target for the Doppler shift may be a threshold accuracy value based on the measurement configuration, for example, based on whether the UE 115-*a* is configured to measure the Doppler shift parameters using a single "shot" over a single time duration or using multiple "shots" over multiple time durations. In such examples, the measurement accuracy target may be greater for measurements over multiple time durations.

In some other examples, the measurement accuracy may be associated with the number of reference signals or the reference signal timing structure the UE 115-*a* may use to estimate the Doppler shift parameters. For example, if Doppler shift measurements are based on a 2-slot tracking reference signal (TRS), the measurement accuracy may be greater than a single-slot TRS and single sideband (SSB) measurements. In some other cases, the measurement accuracy may be associated with a DMRS of a PDSCH, in which case the measurement accuracy may be based on the number of DMRS symbols present in the PDSCH.

Upon measuring the Doppler shift parameters, the UE 115-*a* may generate a measurement report 225 (e.g., a CSI measurement report) associated with the Doppler shift measured over received reference signals to transmit to the TRPs 205. The UE 115-*a* may identify a range of Doppler shift values (e.g., based on a threshold resolvable Doppler shift value) that it may report to the TRPs 205. In some cases, the range of Doppler shift values may be based on the reference signal structure used for the Doppler shift measurement. In such cases, the UE 115-*a* may determine the range to be an inverse of the time-domain gap between two consecutive measurement samples or the time between the reference signals. In some other examples, the TRP 205-*a* or 205-*b* may configure a range of Doppler shift values that the UE 115-*a* may report, and may notify the UE 115-*a* of the configured range. In some other cases, the UE 115-*a* may report a threshold pull-in-range in a first transmission (e.g., in a MAC-CE) and may report the measured value for the Doppler shift in a second transmission (e.g., in an uplink control information (UCI) transmission). Similarly, in some cases the UE 115-*a* may report the threshold pull-in-range in a first portion of the CSI report, and the measured value in a second portion of the CSI report.

The UE 115-*a* may determine a granularity for reporting the Doppler shift parameters based on the number of time durations (e.g., single or multiple "shot") used to measure the Doppler shift, or based on the range of resolvable Doppler shift values. For example, in some implementations, the UE 115-*a* may identify a number of bins for reporting the estimated Doppler shift parameters. The UE 115-*a* may quantize the estimated Doppler shift to a digital value and a discrete value based on the bin size. For example, the UE 115-*a* may use a number of bits (N bits) for reporting the Doppler shift parameters, and $2^N$ bins may be allocated for the quantized Doppler shift parameters.

In some other examples, the UE 115-*a* may identify a bin which corresponds to an uncertain Doppler shift measurement value. For example, the UE 115-*a* may allocate a measurement to this bin in cases where the measured Doppler shift is uncertain, or in cases where the UE 115-*a* is unable to estimate the Doppler shift. In yet other examples, the UE 115-*a* may allocate a first bin for estimated Doppler shift values that are less than a threshold Doppler shift value. For example, for a determined Doppler shift threshold value X, the first bin may contain Doppler shift values that are less than X. The UE 115-*a* may allocate a second bin for estimated Doppler shift values that are greater than a threshold Doppler shift value. For example, the second bin may contain Doppler shift values that are greater than X.

In yet other examples, the granularity of the Doppler shift report may be based on a one bit indication representing the sign (e.g., a positive or negative value) of the estimated Doppler shift. For example, the one bit indication may have a first value in cases where the estimated Doppler shift is positive (e.g., the UE 115-*a* is moving towards the TRP), and the one bit indication may have a second value different than the first value in cases where the estimated Doppler shift is negative (e.g., the UE 115-*a* is moving away from the TRP).

The UE 115-*a* may generate the measurement report 225 (e.g., the CSI measurement report) associated with the Doppler shift measured over received reference signals, and according to a determined granularity of the report. The UE 115-*a* may transmit the measurement report 225 to one or more TRPs, which may use the measurement report 225 to identify the Doppler shift parameters for the reference signals transmitted to the UE 115-*a*. In some cases, however, the measurement report 225 may collide with one or more other communications sent to the TRPs 205. In such cases, a prioritization rule may be applied for the collision. For example, if multiple CSI reports with the same time-domain behavior and physical channel collide, the reports may be prioritized based on the content of the CSI reports. In some cases, beam reporting may be prioritized before Doppler shift reporting information, and both beam reporting and Doppler shift reporting may be prioritized before CSI reporting. In some other cases, beam reporting may be prioritized before CSI reporting, and both beam reporting and CSI reporting may be prioritized before Doppler shift reporting information. In addition, other prioritization rules may be possible.

For cases in which one measurement report 225 contains multiple Doppler shift estimates (e.g., shifts from multiple reference signals, multiple component carriers, or shifts from multiple frequency bands), the UE 115-*a* may prioritize the Doppler shifts based on a reference signal ID, CORESET ID, and QCL-Info ID.

In some examples, the UE 115-*a* may receive the reference signals 215 and may transmit the measurement report 225 based on a TCI state corresponding to a TRP 205, which may in some cases allow the UE 115-*a* to identify transmissions from each TRP 205 in the SFN. In some cases, one or both of the TRPs 205 may transmit an indication (e.g., via DCI) of a first TCI state associated with the first reference signal 215 and a second TCI state (e.g., unique from the first TCI state) associated with the second reference signal 215. In some cases, the UE 115-*a* may identify which TRP 205 is associated with which reference signal 215 based on a TCI state associated with the reference signal 215 (e.g., based on a CORESET associated with the received DCI indicating the TCI states). That is, the CORESET associated with the DCI indication may be associated with a CORESET index (e.g., a CORESETPoolIndex) that indicates one or more TRPs 205.

For example, the first TRP 205-*a* may be associated with a first CORESET index and the TRP 205-*b* may be associated with a second CORESET index. Here, the UE 115-*a* may identify that the first TCI state is associated with the first reference signal 215 based on a CORESET of the indication of the first TCI state being associated with the first CORESET index. Additionally, the UE 115-*a* may identify that the second TCI state is associated with the second reference signal 215 based on a CORESET of the indication of the second TCI state being associated with the second CORESET index. The UE 115-*a* may determine which reference signals are transmitted from each TRP 205 based on the TCI states and the CORESET index, and may similarly associate the generated measurement report 225 to be associated with the TCI state and CORESET index associated with a respective TRP 205, such that each TRP 205 may identify the Doppler shift and measurement report 225. For example, the UE 115-*a* may indicate the estimated Doppler parameters (e.g., an estimated Doppler shift, an estimated Doppler spread, or both) in the measurement report 225 as being associated with the first TRP 205-*a* and the second TRP 205-*b* to one or both of the TRPs 205.

Figure 3A:
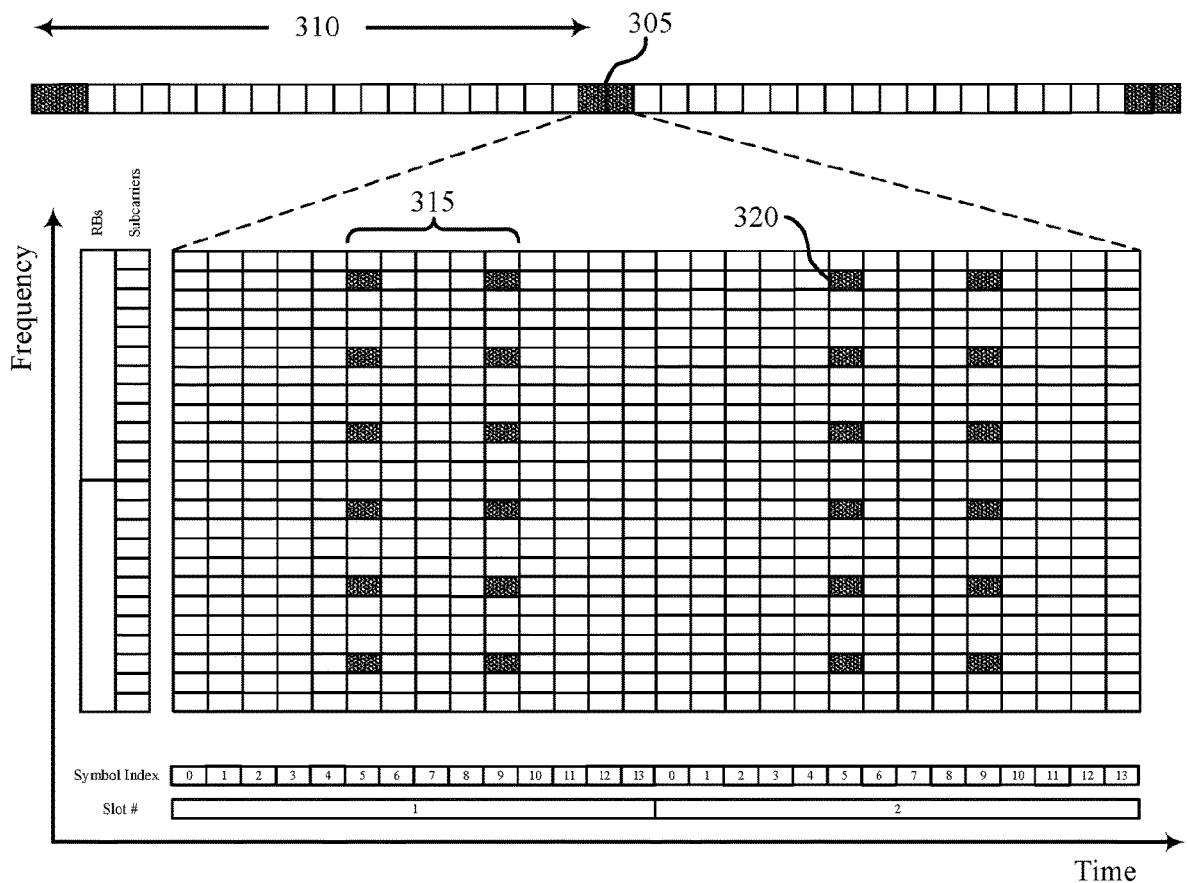
FIGS. 3A and 3B illustrate examples of a tracking reference signal (TRS) configuration and a reference signal structure that support measurement configuration for Doppler shift reporting in accordance with aspects of the present disclosure.
Figure 3B:
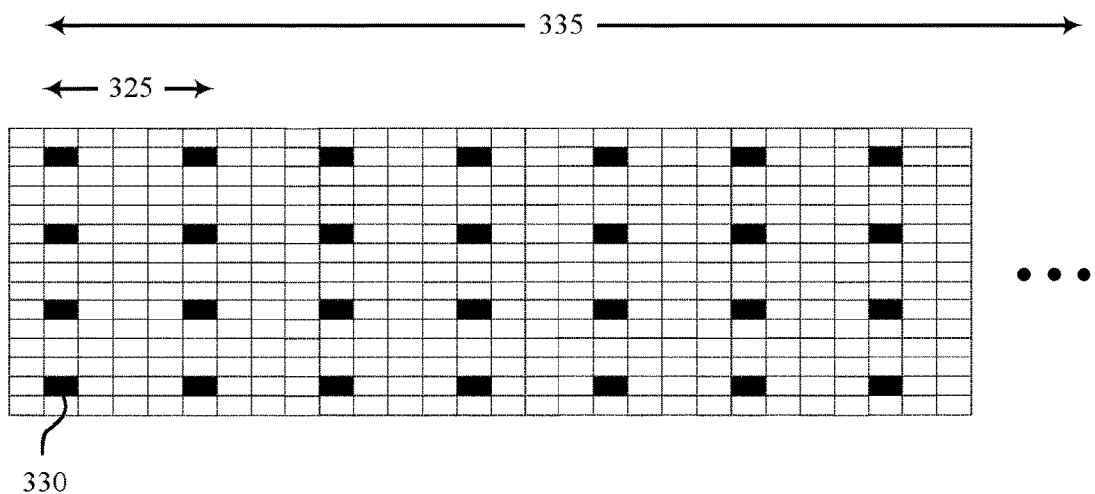

FIGS. 3A and 3B illustrate an example of a tracking reference signal (TRS) configuration 300-*a* and a reference signal structure 300-*b*, respectively, that support measurement configuration for Doppler shift reporting in accordance with aspects of the present disclosure. In some examples, TRS configuration 300-*a* and reference signal structure 300-*b* may implement aspects of wireless communication system 100. For example, TRS configuration 300-*a* and reference signal structure 300-*b* may be used for communications between a UE 115 and TRPs 205 described with reference to FIGS. 1 and 2. Although the examples in FIGS. 3A and 3B are described with reference to TRS, it should be understood that any other reference signals may be used for the measuring and reporting of Doppler shift parameters as described herein.

FIG. 3A shows a tracking reference signal configuration 300-*a*, which may be used by a UE for time-frequency tracking, and may in some cases indicate a reference signal configuration that the UE may use to measure one or more Doppler shift parameters. In some examples, a UE may be configured with a CSI-RS which may indicate a configuration for the TRS, including a reference signal structure for measuring Doppler shift. The TRS configuration 300-*a* may be a TRS burst, which may consist of two TRS symbols 305 in two adjacent slots (e.g., slot 1 and slot 2). In some examples, a TRP or a base station may transmit reference signals to a UE using the TRS burst. The TRS burst may be repeated in accordance with a time period 310 (e.g., 10 ms, 20 ms, 40 ms, or 80 ms TRS burst periodicity). Each slot may include a number of configurable symbol locations 320 for the TRS. Each symbol location 320 may be separated by an inter-symbol distance 315 of four OFDM symbols. In addition, each subcarrier location for the TRS may be separated by an inter-subcarrier distance of 4 subcarriers. In some implementations, the capability of a UE to measure and report Doppler shift parameters may be based on time-frequency tracking and the reference signal structure of the TRS.

FIG. 3B shows an example reference signal structure 300-*b* that a base station or a TRP (e.g., such as a TRP 205 described with reference to FIG. 2) may use to transmit reference signals to a UE in a wireless communications network. The reference signal structure 300-b may include a number of slots 325 (e.g., a 0.5 ms, 30 kHz slot) that may include a number of reference signals 330. The reference signal structure may be configured for a duration 335, which may indicate a time period or a number of slots that the UE may monitor for reference signals.

The reference signal structure 300-b may be configured based on a number of observations of reference signals for time duration 335, and based on a number of symbols allocated per one reference signal. In some cases, the reference signal structure may be indicated by a pair representation (A, B), where A is the number of reference signal observations over the time duration 335, and B represents the number of symbols per one reference signal observation. Each reference signal configuration may be associated with different Doppler parameters, such as Doppler resolution and maximum resolvable Doppler. In some examples, the UE may receive a measurement configuration 210 from one or more TRPs in the wireless communications network, which may indicate a number of reference signal durations that the UE may use to measure Doppler shift parameters. In some cases, a single time duration may be a group of reference signals indicated by the reference signal configuration 300-b. In addition, each reference signal configuration may represent a single time duration or a "shot," and the UE may measure a single reference signal configuration or multiple reference signal configurations in order to determine a measurement for Doppler shift associated with the reference signals.

In a first set of examples, a reference signal structure may include 16 reference signal observations (e.g., A=16). For a reference signal structure having a duration of 8 ms and 14 symbols spacing per one reference signal (e.g., (A, B)=(16, 14)), the Doppler resolution may be 125 Hz and the maximum resolvable Doppler may be 2000 Hz. For a reference signal structure having a duration of 4 ms and 7 symbols spacing per one reference signal (e.g., (A, B)=(16, 7)), the Doppler resolution may be 250 Hz and the maximum resolvable Doppler may be 4000 Hz. For a reference signal structure having a duration of 1.1 ms and 2 symbols spacing per one reference signal (e.g., (16, 2)), the Doppler resolution may be 875 Hz and the maximum resolvable Doppler may be 14000 Hz.

In a second set of examples, a reference signal structure may include 8 reference signal observations (e.g., A=8). For a reference signal structure having a duration of 4 ms and 14 symbols spacing per one reference signal (e.g., (A, B)=(8, 14)), the Doppler resolution may be 250 Hz and the maximum resolvable Doppler may be 2000 Hz. For a reference signal structure having a duration of 2 ms and 7 symbols spacing per one reference signal (e.g., (A, B)=(8, 7)), the Doppler resolution may be 500 Hz and the maximum resolvable Doppler may be 4000 Hz. For a reference signal structure having a duration of 0.6 ms and 2 symbols spacing per one reference signal (e.g., (A, B)=(8, 2)), the Doppler resolution may be 1750 Hz and the maximum resolvable Doppler may be 14000 Hz.

In a third set of examples, a reference signal structure may include 4 reference signal observations (e.g., A=4). For a reference signal structure having a duration of 2 ms and 14 symbols spacing per one reference signal (e.g., (A, B)=(4, 14)), the Doppler resolution may be 500 Hz and the maximum resolvable Doppler may be 2000 Hz. For a reference signal structure having a duration of 1 ms and 7 symbols spacing per one reference signal (e.g., (A, B)=(4, 7)), the Doppler resolution may be 1000 Hz and the maximum resolvable Doppler may be 4000 Hz. For a reference signal structure having a duration of 0.28 ms and 2 symbols spacing per one reference signal (e.g., (A, B)=(4, 2)), the Doppler resolution may be 3500 Hz and the maximum resolvable Doppler may be 14000 Hz.

The ability of the UE to measure Doppler shift associated with the transmitted reference signals may be affected by the reference signal configuration in frequency and time. For example, increasing the number of reference signals in a given time period may increase processing gain, but may also increase pull-in range (e.g., the maximum/minimum resolvable Doppler range). The time-frequency tracking and Doppler delay and spread estimation performance for various parameters (given in the left-most column of Table 1) are impacted by the reference configuration parameters (given in the top column of Table 1). Table 1 displays the impact of reference signal configuration on various tracking performance parameters.

TABLE 1

Impact of Reference Signal Pattern on Tracking Performance

| | Reference Signal Pattern | | | |
| --- | --- | --- | --- | --- |
| Estimation Type | Density in Time | Time Span | Density in Frequency | BW |
| Time Offset | Processing gain | | Pull-in range | Time resolution |
| Delay Spread | | | Maximum resolvable delay spread | |
| Frequency Offset | Pull-in range | Processing gain | | Processing gain |
| Doppler Spread | Maximum resolvable Doppler spread | Doppler resolution | | |

Figure 4:
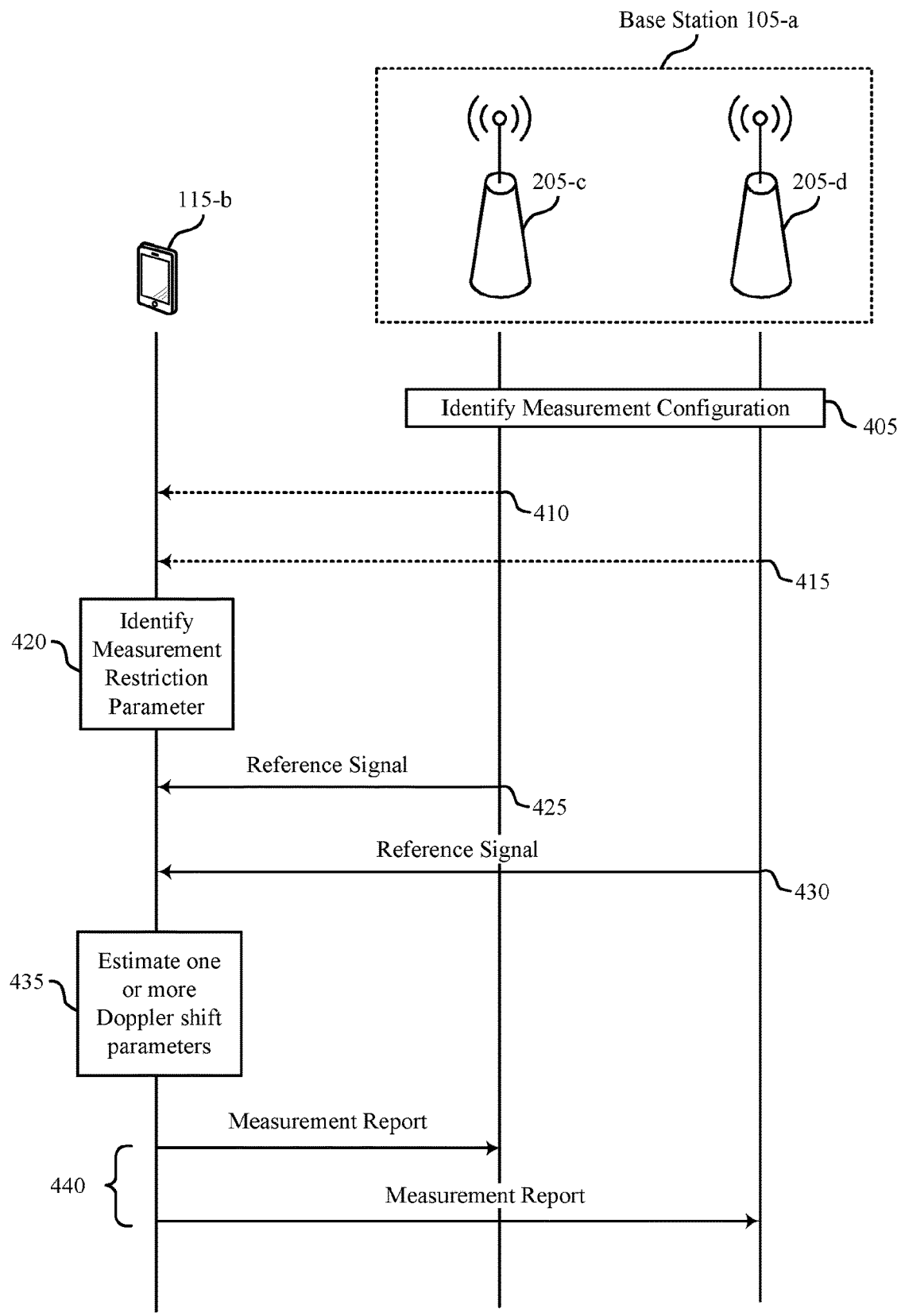
FIG. 4 illustrates an example of a process flow diagram that supports measurement configuration for Doppler shift reporting in accordance with aspects of the present disclosure.

FIG. 4 illustrates an example of a process flow 400 that supports measurement configuration for Doppler shift reporting in accordance with aspects of the present disclosure. In some examples, process flow 400 may implement aspects of wireless communications systems as described with reference to FIGS. 1-3. For example, UE 115-b may be an example of the UEs 115 as described with reference to FIGS. 1-3. Additionally, base station 105-a may include TRPs 205-c and 205-d that may be examples a base station 105 and TRPs 205 as described with reference to FIGS. 1-3.

At 405, the TRPs 205-c and 205-d may identify a measurement restriction parameter that indicates a number of time durations over which UE 115-b is configured to measure for estimating one or more Doppler shift parameters associated with a set of reference signals transmitted from the TRPs 205-c and 205-d. In some examples, each time duration may correspond to an allocated time for monitoring the set of reference signals, and may be one or more slots in duration.

At 410 and 415, the TRPs 205-c and 205-d may optionally transmit one or more measurement configuration message to the UE 115-b, the measurement configuration message including the measurement restriction parameter for estimating the one or more Doppler shift parameters associated with the set of reference signals.

At 420, the UE 115-b may receive a measurement configuration for estimating the one or more Doppler shift parameters associated with a set of reference signals 425 and 430 transmitted from TRPs 205-c and 205-d. The UE 115-b may identify a measurement restriction parameter (e.g., transmitted as part of the measurement configuration) that indicates a number of time durations over which the UE 115-*b* is configured to measure for estimating the one or more Doppler shift parameters. In some examples, each time duration of the number of time durations includes a number of reference signals of the set of reference signals 425 and 430.

In some cases, the measurement configuration may include various additional information for the UE 115-*b* to use to generate a measurement report for the estimated Doppler shift parameters. In some cases, the UE 115-*b* may identify a measurement accuracy for estimating the one or more Doppler shift parameters, and the measurement accuracy may be based on the measurement restriction parameter. In some examples, the measurement restriction parameter may indicate a number of time durations, and the measurement accuracy may be determined based on whether the number of time durations is more than a single time duration indicated by the measurement restriction parameter. In some other cases, the measurement accuracy for estimating the one or more Doppler shift parameters may be based on a transmission timing structure for the set of reference signals 425 and 430 (e.g., a reference signal configuration), or in some cases the measurement accuracy may be based on a reference signal type.

In some cases, the number of time durations indicated in the measurement restriction parameter may correspond to a single time duration associated with a single configured group of the set of reference signals 425 and 430, and the UE 115-*b* may estimate the Doppler shift parameters using measurements over the single time duration of a Doppler shift associated with the single configured group of the set of reference signals 425 and 430. In some other cases, the number of time durations indicated in the measurement restriction parameter may correspond to a set of multiple time durations associated with a number of configured groups of the set of reference signals 425 and 430, and the UE 115-*b* may estimate the Doppler shift parameters based on a calculated average of Doppler shift values associated with the set of multiple time durations. In yet other cases, the UE 115-*b* may determine that the measurement restriction parameter indicates one or more slots over which the UE 115-*b* is configured to measure for estimating the one or more Doppler shift parameters, and the UE 115-*b* may estimate the Doppler shift parameters according to the integer value of slots indicated by the measurement restriction parameter.

At 435, the UE 115-*b* may estimate the Doppler shift parameters based on the measurement configuration and the measurement restriction parameter. In addition, the UE 115-*b* may identify a range of resolvable Doppler shift values (e.g., based on receiving a downlink message, the measurement configuration, or other indications), and may estimate the one or more Doppler shift parameters in accordance with the range of resolvable Doppler shift values. In some cases, the rage may include a time-domain gap between consecutive samples of the set of reference signals. Additionally or alternatively, the UE 115-*b* may report the range of resolvable Doppler shift values in the measurement report, where a first portion of the report indicates the estimated Doppler shift parameters and a second portion of the report indicates the range of resolvable Doppler shift values.

The UE 115-*b* may further generate the measurement report in accordance with a granularity for reporting the one or more Doppler shift parameters. For example, the UE 115-*b* may allocate a number of bits for reporting the one or more Doppler shift parameters and may determine the granularity for reporting the one or more Doppler shift parameters based on the range of resolvable Doppler shift values and the number of bits. In some other examples, the UE 115-*b* may determine the granularity for the measurement report based on the number of time durations over which the UE 115-*b* is configured to use for estimating the one or more Doppler shift parameters.

The UE 115-*b* may further determine a granularity for the measurement report by assigning the measured one or more Doppler shift parameters to a number of bins. The UE 115-*b* may identify a set of bins associated with one or more Doppler shift values, and may identify a numerical value representative of the Doppler shift parameters (e.g., the Doppler shift parameters may be quantized based on the assignment of a numerical value). The UE 115-*b* may allocate the estimated Doppler shift parameters to a bin of the set of bins based on the determined numerical value. In some cases, a first bin may be associated with Doppler shift values that are less than a threshold value, and a second bin may be associated with Doppler shift values that exceed the threshold value. In some other cases, the UE 115-*b* may generate a bit that indicates the estimated one or more Doppler shift parameters as having a positive value or negative value based on movement of the UE 115-*b* relative to the TRPs 205-*c* and 205-*d*.

At 440, the UE 115-*b* may transmit the measurement report including the estimated Doppler shift parameters to the TRP 205-*c*, the TRP 205-*d*, or both. In some cases, the measurement report may be a CSI report that indicates a number of parameters such as beam information, estimated Doppler parameters, CSI parameters, etc.

In some cases, the UE 115-*b* may identify a time domain overlap (e.g., a collision) between a first CSI report (e.g., the measurement report) and a second CSI report, and the UE 115-*b* may determine a prioritization for the first CSI report and the second CSI report based on the respective compositions of the first CSI report and second CSI report. For example, the UE 115-*b* may determine the prioritization based on beam reporting information, Doppler reporting information, or channel quality information identified in the first CSI report and the second CSI report. For example, the UE 115-*b* may prioritize beam reporting information before Doppler reporting information or CSI reporting information. In addition, the UE 115-*b* may determine the prioritization of the first and second CSI reports based on a reference signal identifier, a control resource set identifier, or a quasi-co location information identifier associated with the CSI reports. In some other cases, the UE 115-*b* may determine the prioritization based on a downlink message from TRP 205.

In some examples, the UE 115-*b* may transmit the measurement report with a number of indicators such that TRP 205 may be able to identify whether the measurement report is associated with reference signals transmitted by the TRP 205. The UE 115-*b* may generate a first indicator associated with a first Doppler shift estimation parameter for a first TRP, and may generate a second indicator associated with a second Doppler shift estimation parameter for a second TRP. In some examples, the indicators may be different control resource set pool indices or TCI states. The UE 115-*b* may transmit the measurement report at 440 that includes the first indicator and the first Doppler shift estimation parameter and the second indicator and the second Doppler shift estimation parameter to the TRPs 205-*c* and 205-*d*.

Figure 5:
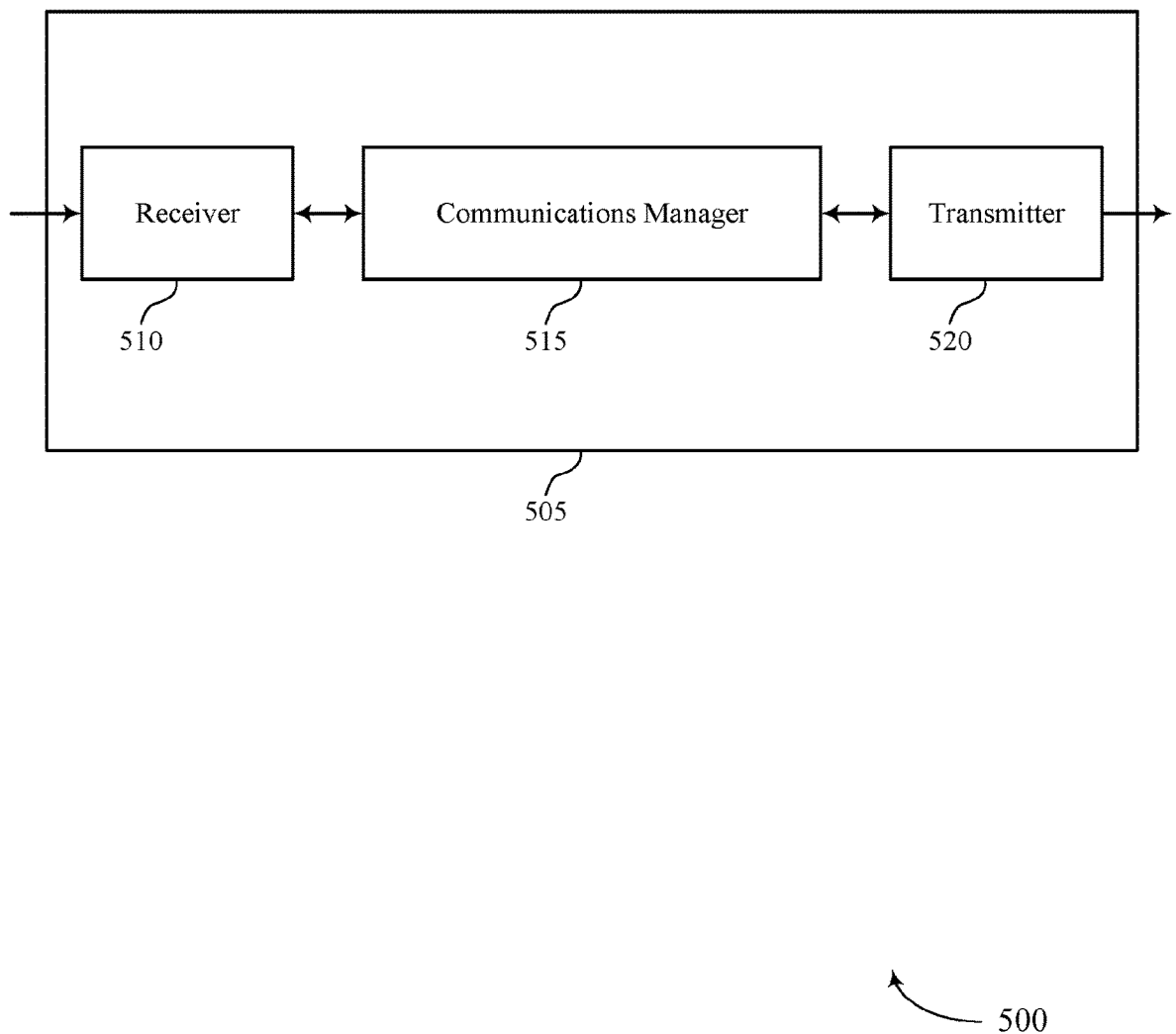
FIGS. 5 and 6 show block diagrams of devices that support measurement configuration for Doppler shift reporting in accordance with aspects of the present disclosure.

FIG. 5 shows a block diagram 500 of a device 505 that supports measurement configuration for Doppler shift reporting in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement configuration for Doppler shift reporting, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a measurement configuration for estimating one or more Doppler shift parameters associated with a set of reference signals transmitted from one or more nodes, identify, based on the measurement configuration, a measurement restriction parameter that indicates a number of time durations over which the UE is configured to measure for estimating the one or more Doppler shift parameters, where each time duration of the number of time durations includes a set of the set of reference signals, and transmit a measurement report indicating an estimated one or more Doppler shift parameters associated with the set of reference signals to the one or more nodes in accordance with the measurement restriction parameter. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
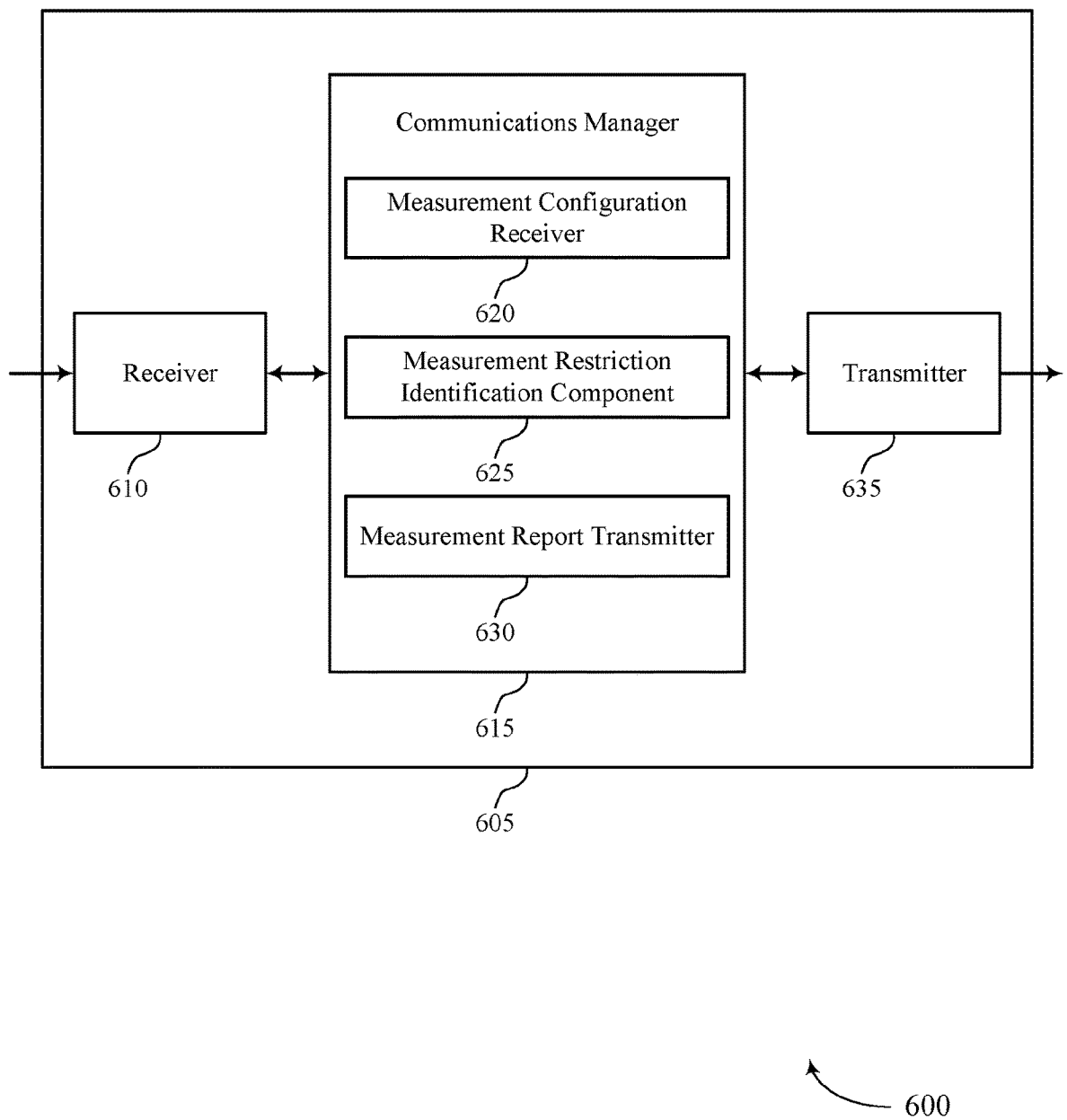

FIG. 6 shows a block diagram 600 of a device 605 that supports measurement configuration for Doppler shift reporting in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to measurement configuration for Doppler shift reporting, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a measurement configuration receiver 620, a measurement restriction identification component 625, and a measurement report transmitter 630. The communications manager 615 may be an example of aspects of the communications manager 810 described herein.

The measurement configuration receiver 620 may receive a measurement configuration for estimating one or more Doppler shift parameters associated with a set of reference signals transmitted from one or more nodes.

The measurement restriction identification component 625 may identify, based on the measurement configuration, a measurement restriction parameter that indicates a number of time durations over which the UE is configured to measure for estimating the one or more Doppler shift parameters, where each time duration of the number of time durations includes a set of the set of reference signals.

The measurement report transmitter 630 may transmit a measurement report indicating an estimated one or more Doppler shift parameters associated with the set of reference signals to the one or more nodes in accordance with the measurement restriction parameter.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable. At least one implementation may enable the communications manager 615 to effectively. At least one implementation may enable communications manager 615 to determine a Doppler shift reporting configuration and measurement restriction parameter associated with reporting Doppler shift to one or more TRPs of a wireless network. At least one implementation may enable communications manager 615 to effectively adapt to high speed communications by adjusting ongoing communications based on measured and reported Doppler shifts for the device 605.

Based on implementing Doppler shift reporting techniques as described herein, one or more processors of the device 605 (e.g., processor(s) controlling or incorporated with one or more of receiver 610, communications manager 815, and transmitter 620) may increase communications reliability and accuracy by adjusting communications to compensate for measured Doppler shift parameters associated with high speed communications of the device 605. In addition, the Doppler shift reporting techniques may further enhance the content of a CSI report, which the device 605 may send periodically to TRPs within the wireless system.

Figure 7:
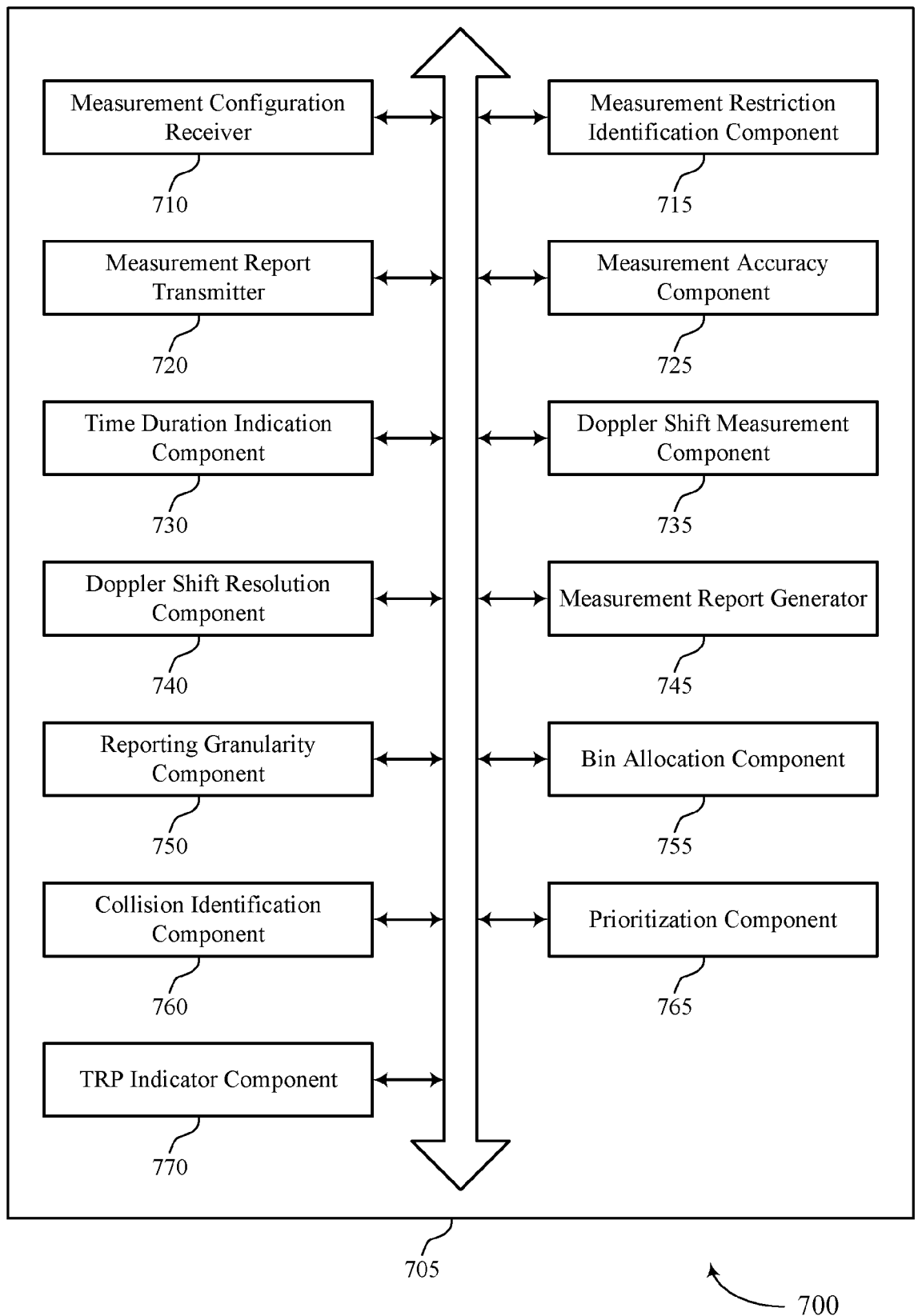
FIG. 7 shows a block diagram of a communications manager that supports measurement configuration for Doppler shift reporting in accordance with aspects of the present disclosure.

FIG. 7 shows a block diagram 700 of a communications manager 705 that supports measurement configuration for Doppler shift reporting in accordance with aspects of the present disclosure. The communications manager 705 may be an example of aspects of a communications manager 515, a communications manager 615, or a communications manager 810 described herein. The communications manager 705 may include a measurement configuration receiver 710, a measurement restriction identification component 715, a measurement report transmitter 720, a measurement accuracy component 725, a time duration indication component 730, a Doppler shift measurement component 735, a Doppler shift resolution component 740, a measurement report generator 745, a reporting granularity component 750, a bin allocation component 755, a collision identification component 760, a prioritization component 765, and a TRP indicator component 770. Each of these modules may communicate, directly or indirectly, with one another (e.g., via one or more buses).

The measurement configuration receiver 710 may receive a measurement configuration for estimating one or more Doppler shift parameters associated with a set of reference signals transmitted from one or more nodes.

The measurement restriction identification component 715 may identify, based on the measurement configuration, a measurement restriction parameter that indicates a number of time durations over which the UE is configured to measure for estimating the one or more Doppler shift parameters, where each time duration of the number of time durations includes a set of the set of reference signals. In some cases, the measurement restriction parameter indicates one or more slots over which the UE is configured to measure for estimating the one or more Doppler shift parameters.

The measurement accuracy component 725 may identify a measurement accuracy for estimating the one or more Doppler shift parameters, where the measurement accuracy is based on the measurement restriction parameter. In some examples, the measurement accuracy component 725 may determine the measurement restriction parameter indicates a number of time durations, where the measurement accuracy is based on whether the number of time durations includes more than a single time duration.

In some examples, the measurement accuracy component 725 may identify a measurement accuracy for estimating the one or more Doppler shift parameters based on a transmission timing structure for the set of reference signals.

In some examples, the measurement accuracy component 725 may identify a measurement accuracy for estimating the one or more Doppler shift parameters based on a reference signal type associated with the set of reference signals.

The time duration indication component 730 may determine the number of time durations includes a single time duration corresponding to a single configured group of the set of reference signals. In some examples, determining the number of time durations includes a set of multiple time durations corresponding to a set of configured groups of the set of reference signals. In some cases, the number of time durations correspond to allocated time for monitoring a group of configured reference signals. In some cases, the number of time durations include one or more slots.

The Doppler shift measurement component 735 may determine the estimated one or more Doppler shift parameters based on a measurement over the single time duration of a Doppler shift associated with the single configured group of the set of reference signals. In some examples, the Doppler shift measurement component 735 may estimate a Doppler shift value based on a measurement over each time duration of the set of multiple time durations.

In some examples, the Doppler shift measurement component 735 may determine the estimated one or more Doppler shift parameters based on averaging Doppler shift values associated with the set of multiple time durations.

The Doppler shift resolution component 740 may identify a range of resolvable Doppler shift values. In some examples, the Doppler shift measurement component 735 may estimate the one or more Doppler shift parameters in accordance with the range of resolvable Doppler shift values. In some examples, the Doppler shift resolution component 740 may identify a time-domain gap between consecutive samples of the set of reference signals. In some examples, the Doppler shift resolution component 740 may receive a downlink message that indicates the range of resolvable Doppler shift values.

The measurement report generator 745 may generate the measurement report including a first indication of the estimated one or more Doppler shift parameters and a second indication of the range of resolvable Doppler shift values.

In some examples, the reporting granularity component 750 may determine a granularity for reporting the one or more Doppler shift parameters based on the range of resolvable Doppler shift values and the number of bits. The reporting granularity component 750 may identify a number of bits allocated for reporting the one or more Doppler shift parameters.

In some examples, the reporting granularity component 750 may determine a granularity for reporting the one or more Doppler shift parameters based on the number of time durations over which the UE is configured to use for estimating the one or more Doppler shift parameters. In some examples, the reporting granularity component 750 may generate a bit that indicates the estimated one or more Doppler shift parameters as having a positive or negative value.

The bin allocation component 755 may identify a set of bins associated with one or more Doppler shift values. In some examples, the bin allocation component 755 may identify a numerical value representative of the estimated one or more Doppler shift parameters. In some examples, the bin allocation component 755 may allocate the estimated one or more Doppler shift parameters to a bin of the set of bins based on the numerical value. In some cases, the estimated one or more Doppler shift parameters are quantized based on the numerical value. In some examples, determining the set of bins includes a first bin associated with Doppler shift values that are less than a threshold value, and a second bin associated with Doppler shift values that exceed the threshold value.

The collision identification component 760 may identify a time-domain overlap between a first channel state information report including the measurement report and a second channel state information report. The prioritization component 765 may determine a prioritization for the first channel state information report and the second channel state information report based on a composition of the first channel state information report and a composition of the second channel state information report. In some cases, the composition includes at least one of beam reporting information, Doppler reporting information, or channel quality information reporting. In some cases, the prioritization is further based on a reference signal identifier, a control resource set identifier, or a quasi-co location information identifier associated with the measurement report.

The TRP indicator component 770 may generate a first indicator associated with a first Doppler shift estimation parameter for a first transmission reception point (TRP). In some examples, the TRP indicator component 770 may generate second indicator associated with a second Doppler shift estimation parameter for a second TRP. In some cases, the first indicator and the second indicator include different control resource set pool indices or transmission configuration indicator states.

The measurement report transmitter 720 may transmit a measurement report indicating an estimated one or more Doppler shift parameters associated with the set of reference signals to the one or more nodes in accordance with the measurement restriction parameter. In some examples, the measurement report transmitter 720 may transmit the measurement report including the first indicator and the first Doppler shift estimation parameter and the second indicator and the second Doppler shift estimation parameter.

Figure 8:
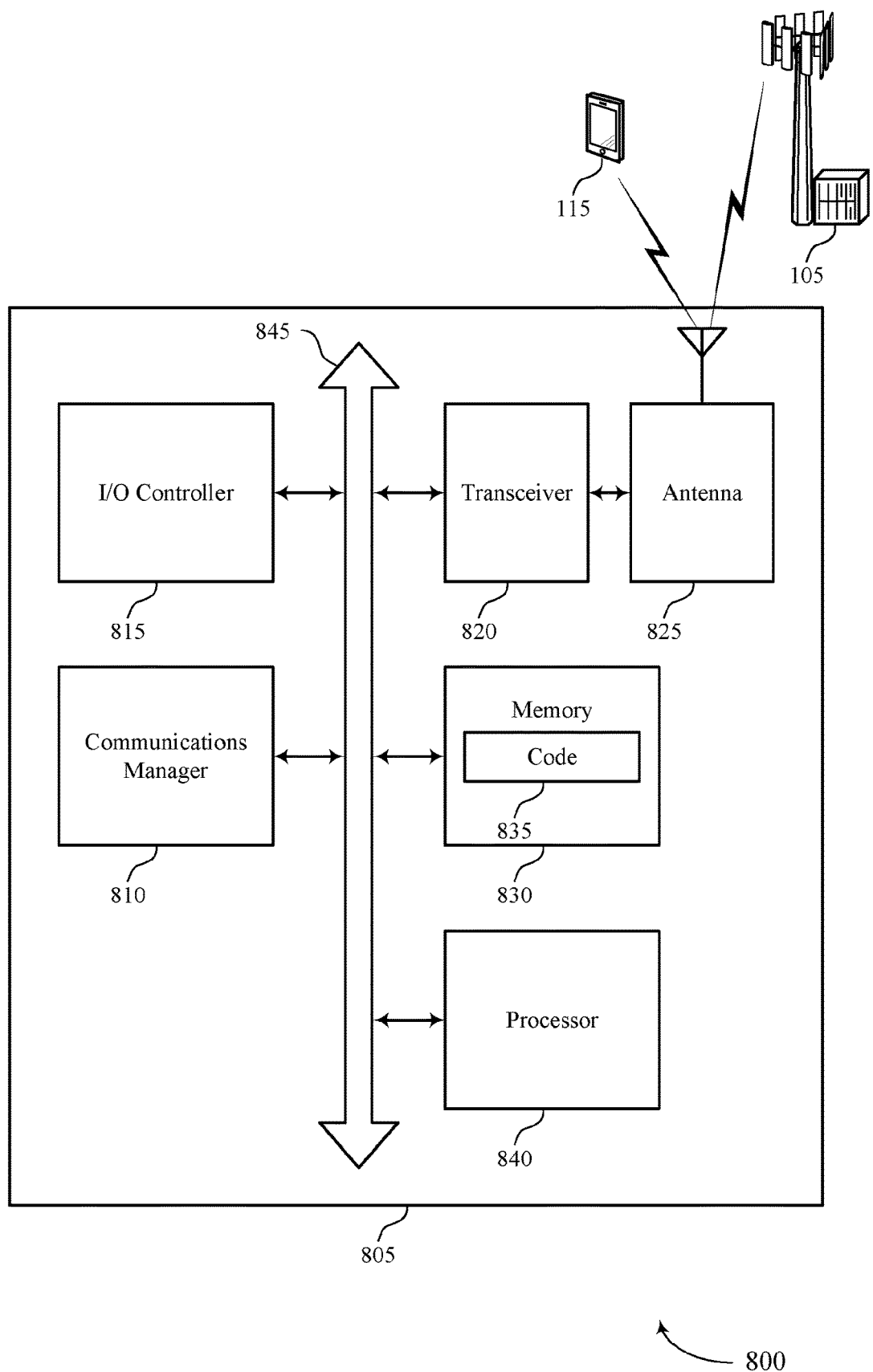
FIG. 8 shows a diagram of a system including a device that supports measurement configuration for Doppler shift reporting in accordance with aspects of the present disclosure.

FIG. 8 shows a diagram of a system 800 including a device 805 that supports measurement configuration for Doppler shift reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a measurement configuration for estimating one or more Doppler shift parameters associated with a set of reference signals transmitted from one or more nodes, identify, based on the measurement configuration, a measurement restriction parameter that indicates a number of time durations over which the UE is configured to measure for estimating the one or more Doppler shift parameters, where each time duration of the number of time durations includes a set of the set of reference signals, and transmit a measurement report indicating an estimated one or more Doppler shift parameters associated with the set of reference signals to the one or more nodes in accordance with the measurement restriction parameter.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement configuration for Doppler shift reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
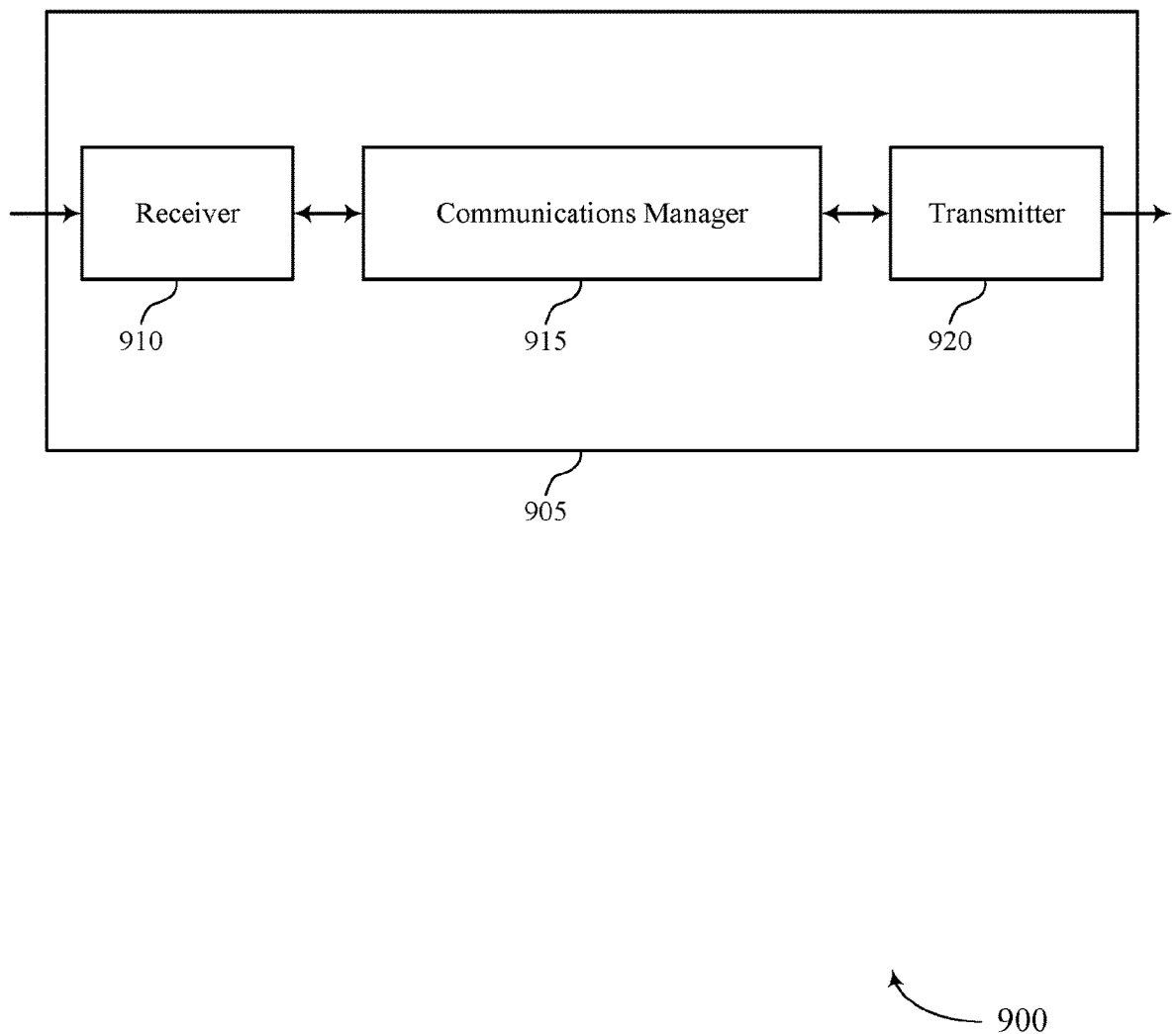
FIGS. 9 and 10 show block diagrams of devices that support measurement configuration for Doppler shift reporting in accordance with aspects of the present disclosure.

FIG. 9 shows a block diagram 900 of a device 905 that supports measurement configuration for Doppler shift reporting in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement configuration for Doppler shift reporting, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmit, to the UE, a measurement configuration message including the measurement restriction parameter for estimating the one or more Doppler shift parameters, and receive, from the UE, a measurement report indicating an estimated one or more Doppler shift parameters associated with the set of reference signals in accordance with the measurement restriction parameter. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
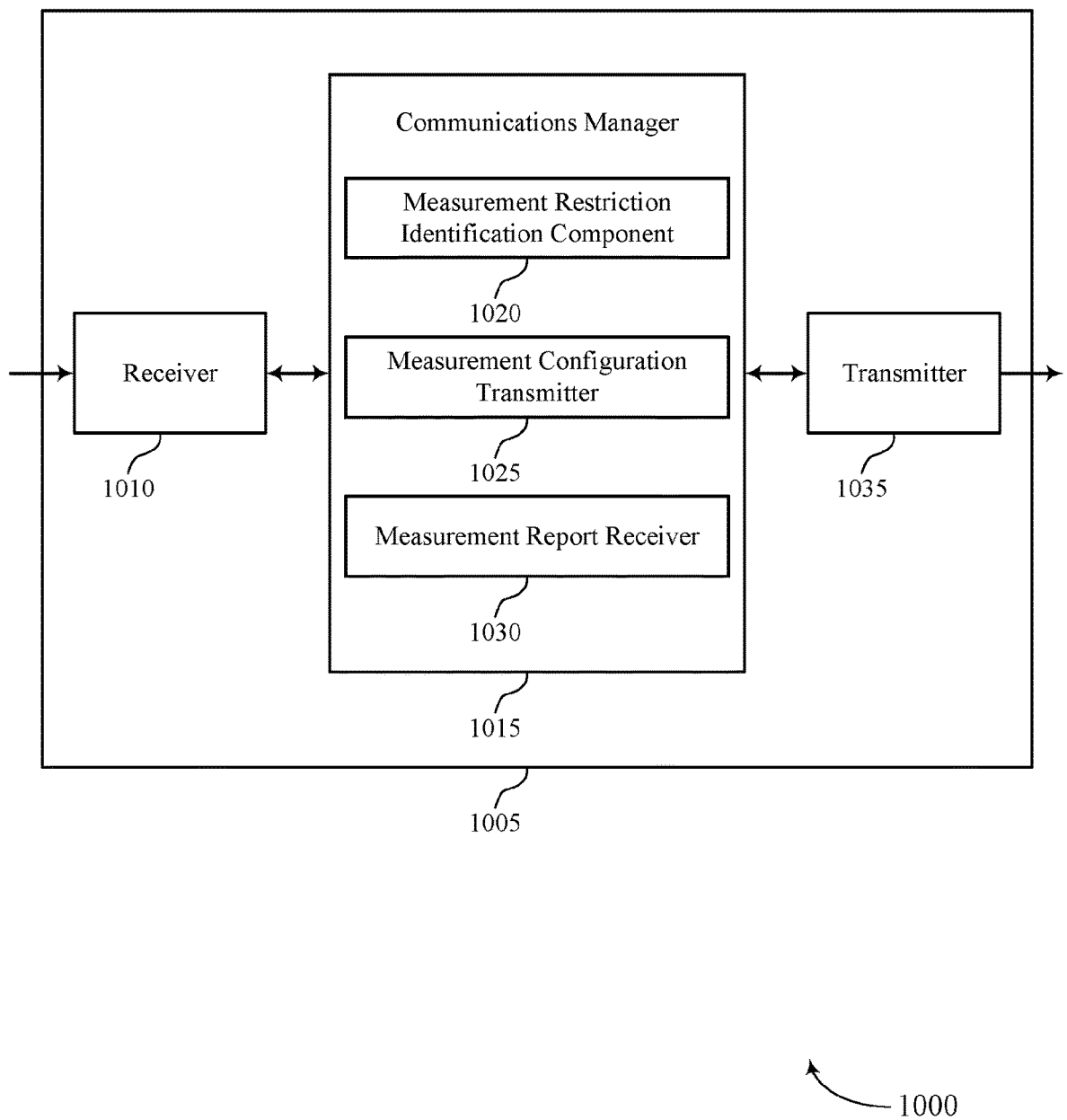

FIG. 10 shows a block diagram 1000 of a device 1005 that supports measurement configuration for Doppler shift reporting in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement configuration for Doppler shift reporting, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a measurement restriction identification component 1020, a measurement configuration transmitter 1025, and a measurement report receiver 1030. The communications manager 1015 may be an example of aspects of the communications manager 1210 described herein.

The measurement restriction identification component 1020 may identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals.

The measurement configuration transmitter 1025 may transmit, to the UE, a measurement configuration message including the measurement restriction parameter for estimating the one or more Doppler shift parameters.

The measurement report receiver 1030 may receive, from the UE, a measurement report indicating an estimated one or more Doppler shift parameters associated with the set of reference signals in accordance with the measurement restriction parameter.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
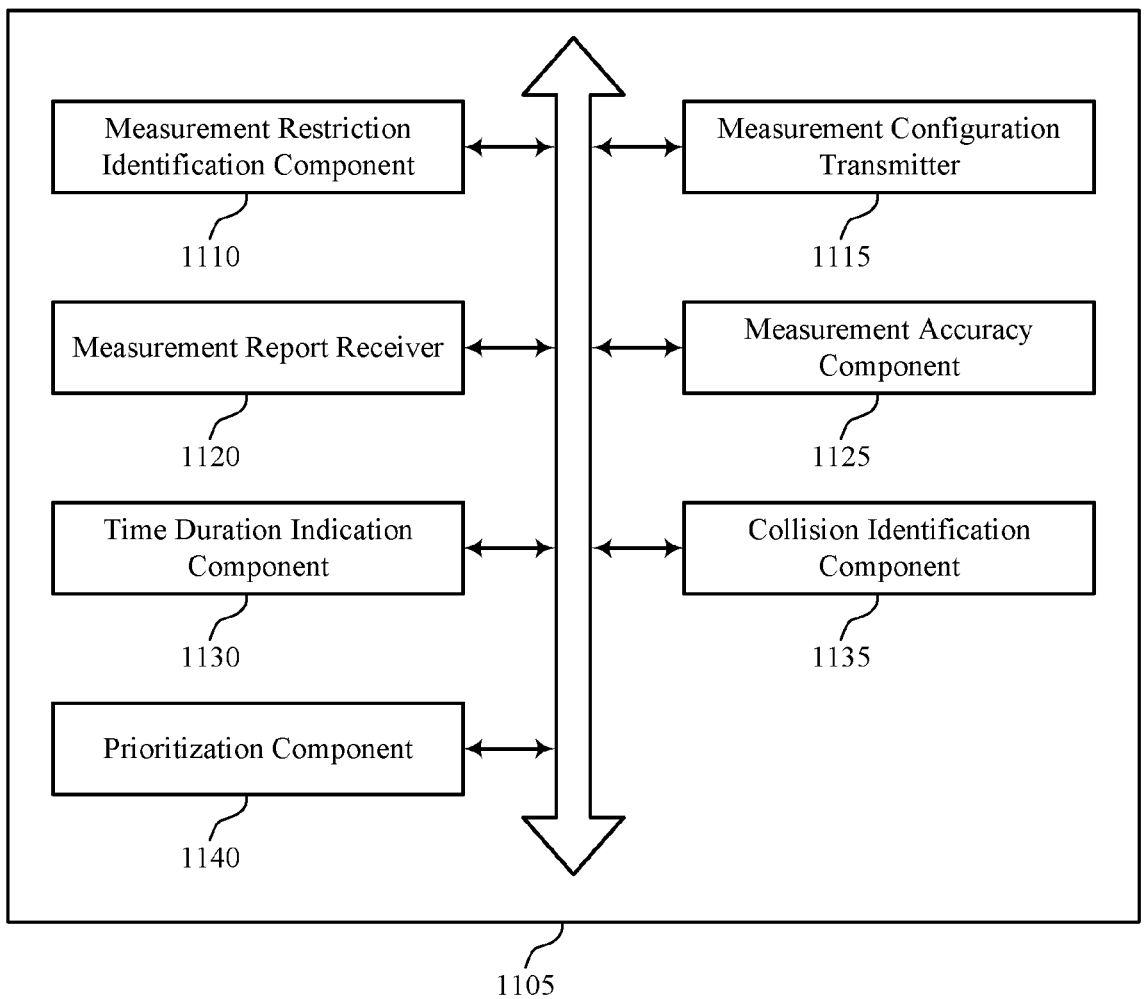
FIG. 11 shows a block diagram of a communications manager that supports measurement configuration for Doppler shift reporting in accordance with aspects of the present disclosure.

FIG. 11 shows a block diagram 1100 of a communications manager 1105 that supports measurement configuration for Doppler shift reporting in accordance with aspects of the present disclosure. The communications manager 1105 may be an example of aspects of a communications manager 915, a communications manager 1015, or a communications manager 1210 described herein. The communications manager 1105 may include a measurement restriction identification component 1110, a measurement configuration transmitter 1115, a measurement report receiver 1120, a measurement accuracy component 1125, a time duration indication component 1130, a collision identification component 1135, and a prioritization component 1140. Each of these modules may communicate, directly or indirectly, with one another (e.g., via one or more buses).

The measurement restriction identification component 1110 may identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals. In some cases, the measurement restriction parameter indicates one or more slots over which the UE is configured to measure for estimating the one or more Doppler shift parameters.

The measurement accuracy component 1125 may identify a measurement accuracy for estimating the one or more Doppler shift parameters, where the measurement accuracy is based on the measurement restriction parameter. In some examples, the measurement accuracy component 1125 may determine the measurement restriction parameter indicates a number of time durations, where the measurement accuracy is based on the number of time durations. In some examples, the measurement accuracy component 1125 may identify a measurement accuracy for estimating the one or more Doppler shift parameters based on a transmission timing structure for the set of reference signals. In some examples, the measurement accuracy component 1125 may identify a measurement accuracy for estimating the one or more Doppler shift parameters based on a reference signal type associated with the set of reference signals.

The time duration indication component 1130 may determine the number of time durations includes a single time duration corresponding to a single configured group of the set of reference signals, where the measurement report is based on a measurement over the single time duration of the one or more Doppler shift parameters associated with the single configured group of the set of reference signals.

In some examples, determining the number of time durations includes a set of multiple time durations corresponding to a set of configured groups of the set of reference signals, where the measurement report includes a Doppler shift value that is estimated based on an average measurement over each time duration of the set of multiple time durations. In some cases, the number of time durations correspond to allocated time for monitoring a group of configured reference signals. In some cases, the number of time durations include one or more slots.

The collision identification component 1135 may identify a time-domain overlap between a first channel state information report including the measurement report and a second channel state information report. The prioritization component 1140 may transmit an indication of a prioritization for the first channel state information report and the second channel state information report based on a composition of the first channel state information report and a composition of the second channel state information report. In some cases, the composition includes at least one of beam reporting information, Doppler reporting information, or channel quality information reporting. In some cases, the prioritization is further based on a reference signal identifier, a control resource set identifier, or a quasi-co location information identifier associated with the measurement report.

The measurement configuration transmitter 1115 may transmit, to the UE, a measurement configuration message including the measurement restriction parameter for estimating the one or more Doppler shift parameters.

The measurement report receiver 1120 may receive, from the UE, a measurement report indicating an estimated one or more Doppler shift parameters associated with the set of reference signals in accordance with the measurement restriction parameter.

Figure 12:
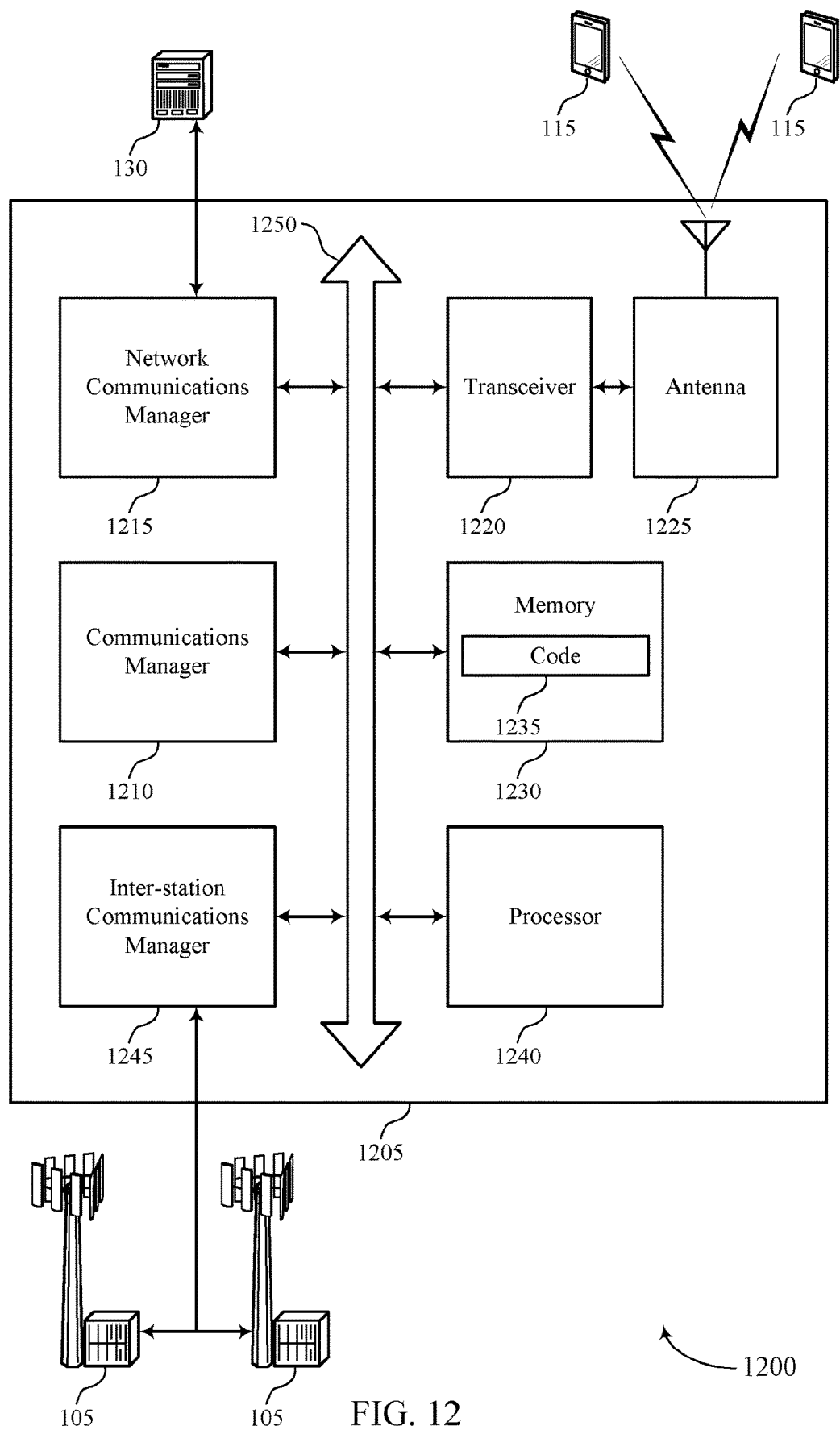
FIG. 12 shows a diagram of a system including a device that supports measurement configuration for Doppler shift reporting in accordance with aspects of the present disclosure.

FIG. 12 shows a diagram of a system 1200 including a device 1205 that supports measurement configuration for Doppler shift reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals, transmit, to the UE, a measurement configuration message including the measurement restriction parameter for estimating the one or more Doppler shift parameters, and receive, from the UE, a measurement report indicating an estimated one or more Doppler shift parameters associated with the set of reference signals in accordance with the measurement restriction parameter.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting measurement configuration for Doppler shift reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
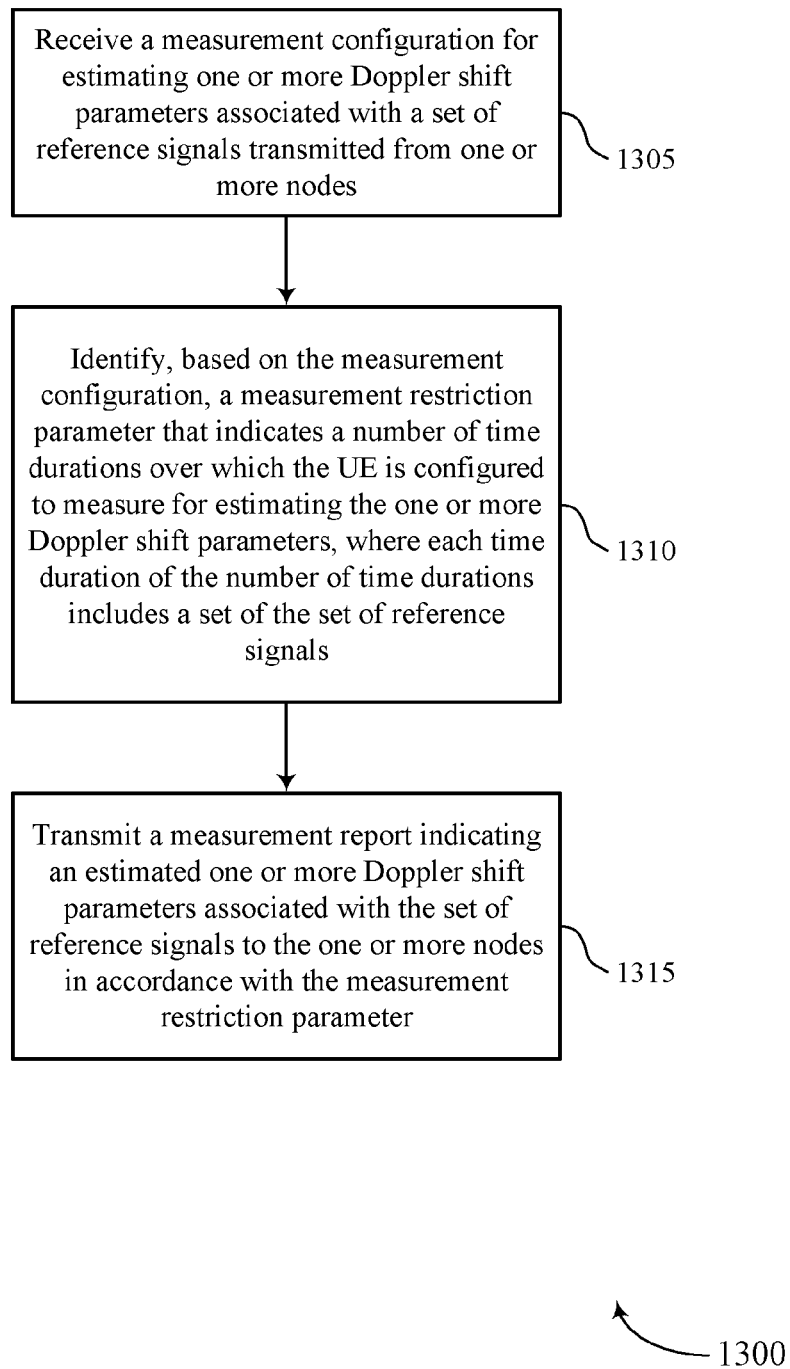
FIGS. 13 through 18 show flowcharts illustrating methods that support measurement configuration for Doppler shift reporting in accordance with aspects of the present disclosure.

FIG. 13 shows a flowchart illustrating a method 1300 that supports measurement configuration for Doppler shift reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a measurement configuration for estimating one or more Doppler shift parameters associated with a set of reference signals transmitted from one or more nodes. The operations of 1305 may be performed according to the methods described herein. In some examples, aspects of the operations of 1305 may be performed by a measurement configuration receiver as described with reference to FIGS. 5 through 8.

At 1310, the UE may identify, based on the measurement configuration, a measurement restriction parameter that indicates a number of time durations over which the UE is configured to measure for estimating the one or more Doppler shift parameters, where each time duration of the number of time durations includes a set of the set of reference signals. The operations of 1310 may be performed according to the methods described herein. In some examples, aspects of the operations of 1310 may be performed by a measurement restriction identification component as described with reference to FIGS. 5 through 8.

At 1315, the UE may transmit a measurement report indicating an estimated one or more Doppler shift parameters associated with the set of reference signals to the one or more nodes in accordance with the measurement restriction parameter. The operations of 1315 may be performed according to the methods described herein. In some examples, aspects of the operations of 1315 may be performed by a measurement report transmitter as described with reference to FIGS. 5 through 8.

Figure 14:
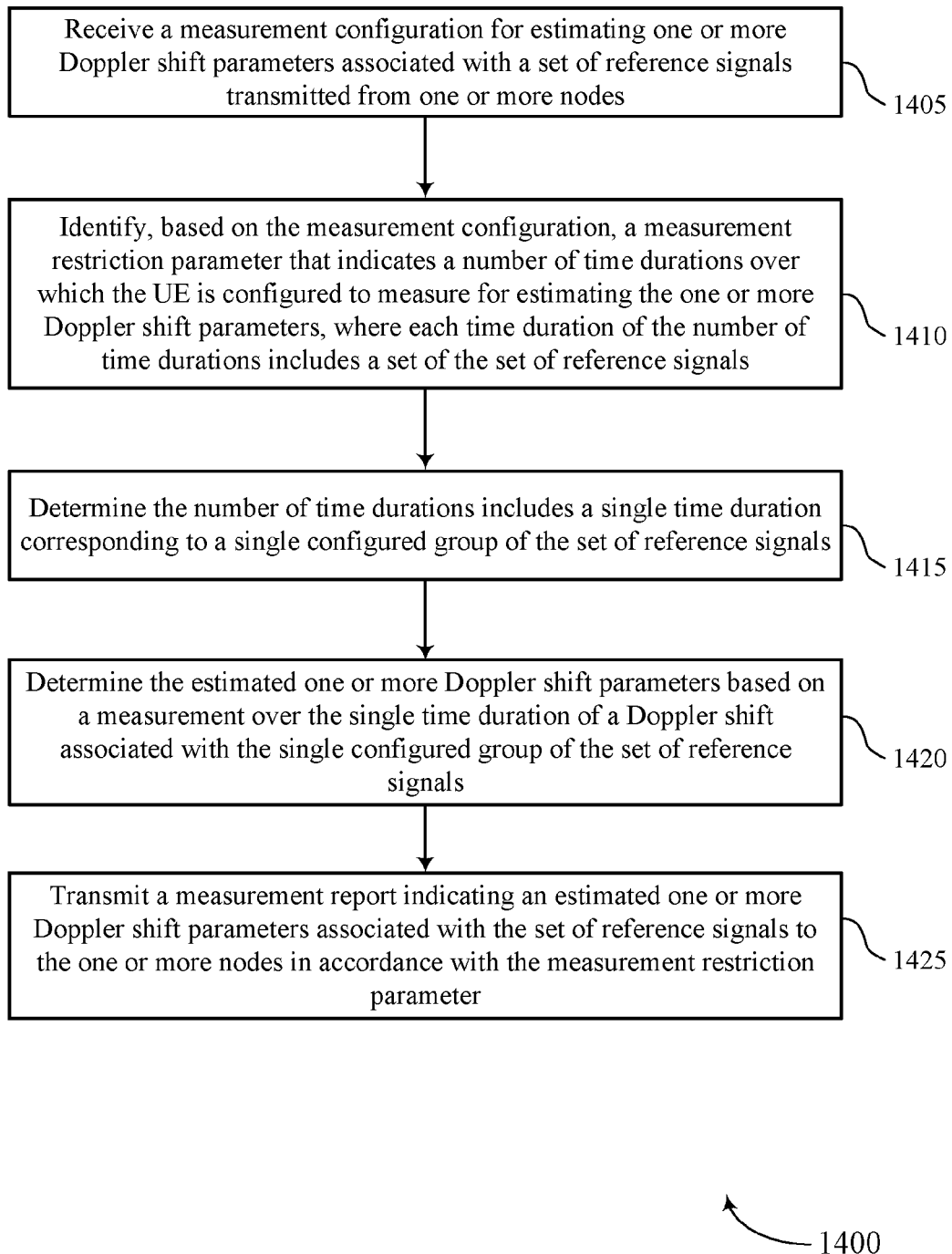

FIG. 14 shows a flowchart illustrating a method 1400 that supports measurement configuration for Doppler shift reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a measurement configuration for estimating one or more Doppler shift parameters associated with a set of reference signals transmitted from one or more nodes. The operations of 1405 may be performed according to the methods described herein. In some examples, aspects of the operations of 1405 may be performed by a measurement configuration receiver as described with reference to FIGS. 5 through 8.

At 1410, the UE may identify, based on the measurement configuration, a measurement restriction parameter that indicates a number of time durations over which the UE is configured to measure for estimating the one or more Doppler shift parameters, where each time duration of the number of time durations includes a set of the set of reference signals. The operations of 1410 may be performed according to the methods described herein. In some examples, aspects of the operations of 1410 may be performed by a measurement restriction identification component as described with reference to FIGS. 5 through 8.

At 1415, the UE may determine the number of time durations includes a single time duration corresponding to a single configured group of the set of reference signals. The operations of 1415 may be performed according to the methods described herein. In some examples, aspects of the operations of 1415 may be performed by a time duration indication component as described with reference to FIGS. 5 through 8.

At 1420, the UE may determine the estimated one or more Doppler shift parameters based on a measurement over the single time duration of a Doppler shift associated with the single configured group of the set of reference signals. The operations of 1420 may be performed according to the methods described herein. In some examples, aspects of the operations of 1420 may be performed by a Doppler shift measurement component as described with reference to FIGS. 5 through 8.

At 1425, the UE may transmit a measurement report indicating an estimated one or more Doppler shift parameters associated with the set of reference signals to the one or more nodes in accordance with the measurement restriction parameter. The operations of 1425 may be performed according to the methods described herein. In some examples, aspects of the operations of 1425 may be performed by a measurement report transmitter as described with reference to FIGS. 5 through 8.

Figure 15:
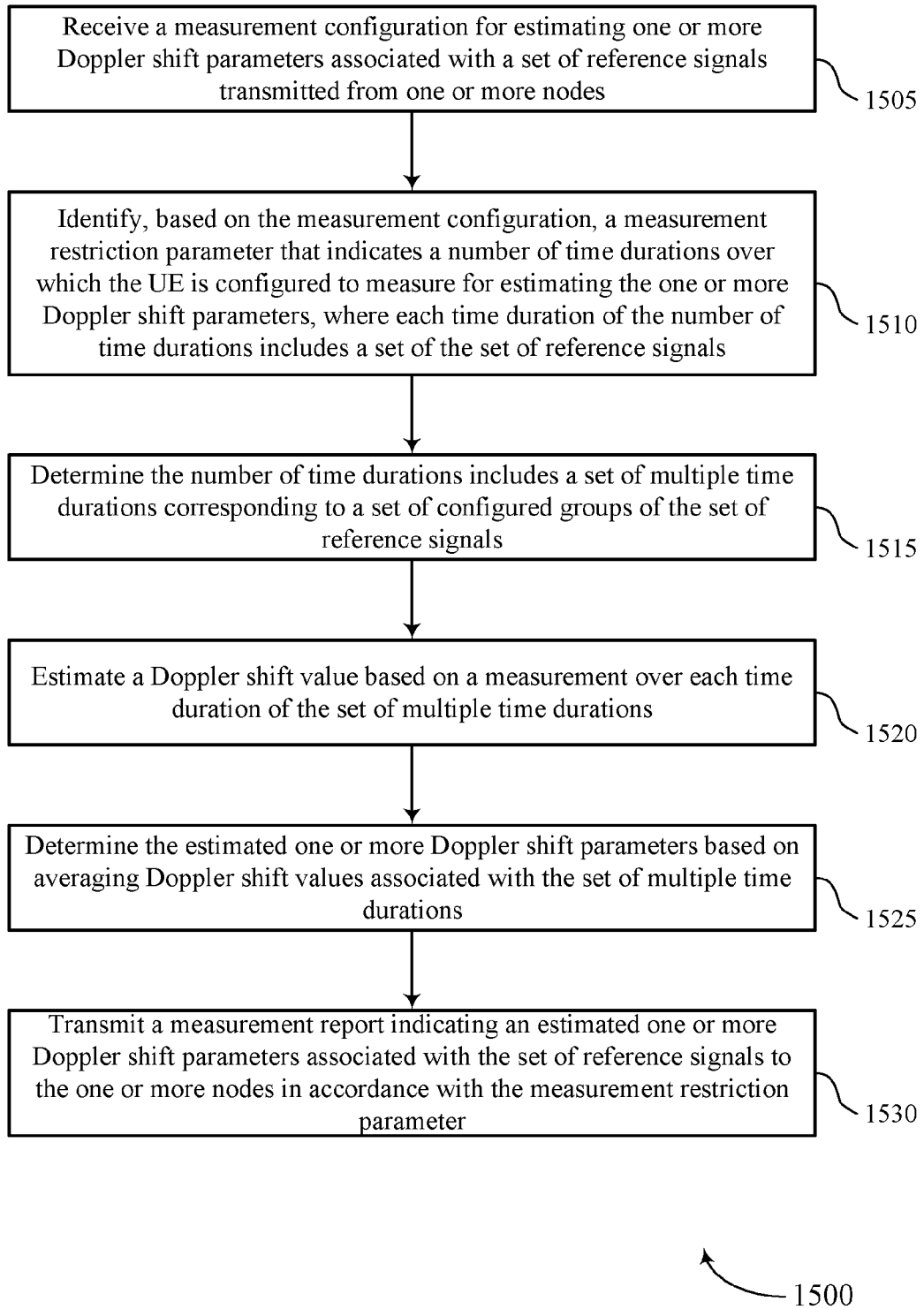

FIG. 15 shows a flowchart illustrating a method 1500 that supports measurement configuration for Doppler shift reporting in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a measurement configuration for estimating one or more Doppler shift parameters associated with a set of reference signals transmitted from one or more nodes. The operations of 1505 may be performed according to the methods described herein. In some examples, aspects of the operations of 1505 may be performed by a measurement configuration receiver as described with reference to FIGS. 5 through 8.

At 1510, the UE may identify, based on the measurement configuration, a measurement restriction parameter that indicates a number of time durations over which the UE is configured to measure for estimating the one or more Doppler shift parameters, where each time duration of the number of time durations includes a set of the set of reference signals. The operations of 1510 may be performed according to the methods described herein. In some examples, aspects of the operations of 1510 may be performed by a measurement restriction identification component as described with reference to FIGS. 5 through 8.

At 1515, the UE may determine the number of time durations includes a set of multiple time durations corresponding to a set of configured groups of the set of reference signals. The operations of 1515 may be performed according to the methods described herein. In some examples, aspects of the operations of 1515 may be performed by a time duration indication component as described with reference to FIGS. 5 through 8.

At 1520, the UE may estimate a Doppler shift value based on a measurement over each time duration of the set of multiple time durations. The operations of 1520 may be performed according to the methods described herein. In some examples, aspects of the operations of 1520 may be performed by a Doppler shift measurement component as described with reference to FIGS. 5 through 8.

At 1525, the UE may determine the estimated one or more Doppler shift parameters based on averaging Doppler shift values associated with the set of multiple time durations. The operations of 1525 may be performed according to the methods described herein. In some examples, aspects of the operations of 1525 may be performed by a Doppler shift measurement component as described with reference to FIGS. 5 through 8.

At 1530, the UE may transmit a measurement report indicating an estimated one or more Doppler shift parameters associated with the set of reference signals to the one or more nodes in accordance with the measurement restriction parameter. The operations of 1530 may be performed according to the methods described herein. In some examples, aspects of the operations of 1530 may be performed by a measurement report transmitter as described with reference to FIGS. 5 through 8.

Figure 16:
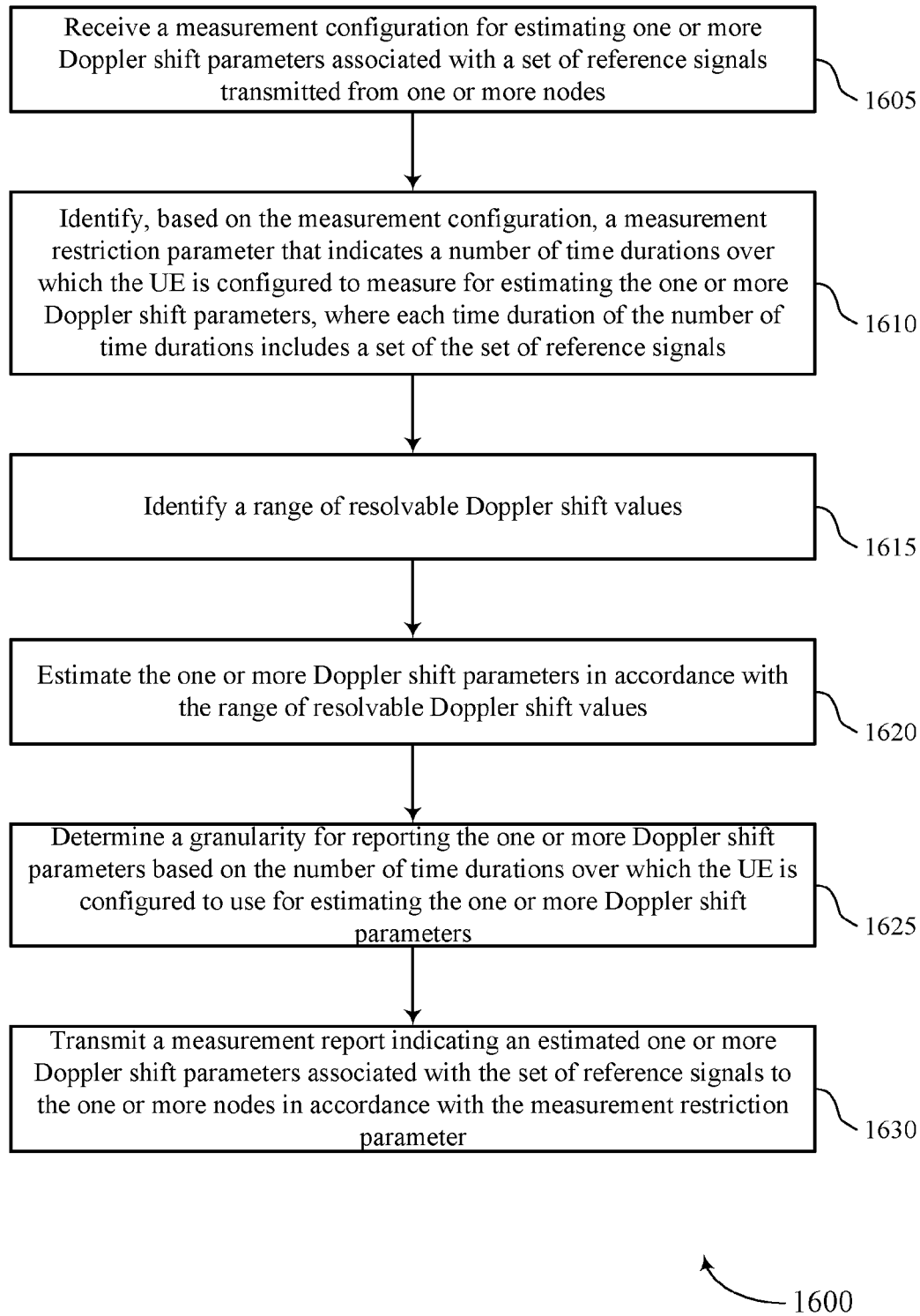

FIG. 16 shows a flowchart illustrating a method 1600 that supports measurement configuration for Doppler shift reporting in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive a measurement configuration for estimating one or more Doppler shift parameters associated with a set of reference signals transmitted from one or more nodes. The operations of 1605 may be performed according to the methods described herein. In some examples, aspects of the operations of 1605 may be performed by a measurement configuration receiver as described with reference to FIGS. 5 through 8.

At 1610, the UE may identify, based on the measurement configuration, a measurement restriction parameter that indicates a number of time durations over which the UE is configured to measure for estimating the one or more Doppler shift parameters, where each time duration of the number of time durations includes a set of the set of reference signals. The operations of 1610 may be performed according to the methods described herein. In some examples, aspects of the operations of 1610 may be performed by a measurement restriction identification component as described with reference to FIGS. 5 through 8.

At 1615, the UE may identify a range of resolvable Doppler shift values. The operations of 1615 may be performed according to the methods described herein. In some examples, aspects of the operations of 1615 may be performed by a Doppler shift resolution component as described with reference to FIGS. 5 through 8.

At 1620, the UE may estimate the one or more Doppler shift parameters in accordance with the range of resolvable Doppler shift values. The operations of 1620 may be performed according to the methods described herein. In some examples, aspects of the operations of 1620 may be performed by a Doppler shift measurement component as described with reference to FIGS. 5 through 8.

At 1625, the UE may determine a granularity for reporting the one or more Doppler shift parameters based on the number of time durations over which the UE is configured to use for estimating the one or more Doppler shift parameters. The operations of 1625 may be performed according to the methods described herein. In some examples, aspects of the operations of 1625 may be performed by a reporting granularity component as described with reference to FIGS. 5 through 8.

At 1630, the UE may transmit a measurement report indicating an estimated one or more Doppler shift parameters associated with the set of reference signals to the one or more nodes in accordance with the measurement restriction parameter. The operations of 1630 may be performed according to the methods described herein. In some examples, aspects of the operations of 1630 may be performed by a measurement report transmitter as described with reference to FIGS. 5 through 8.

Figure 17:
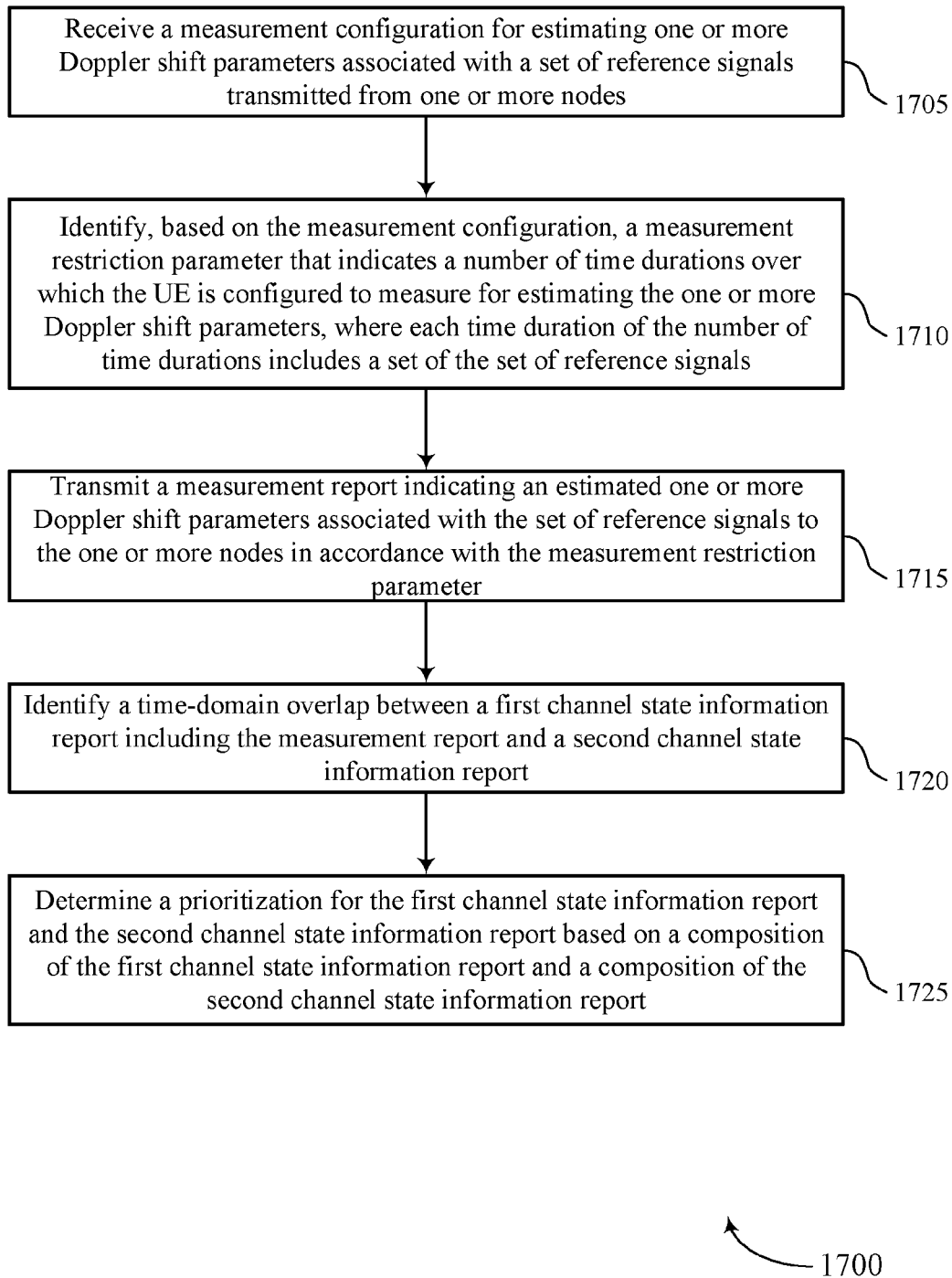

FIG. 17 shows a flowchart illustrating a method 1700 that supports measurement configuration for Doppler shift reporting in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive a measurement configuration for estimating one or more Doppler shift parameters associated with a set of reference signals transmitted from one or more nodes. The operations of 1705 may be performed according to the methods described herein. In some examples, aspects of the operations of 1705 may be performed by a measurement configuration receiver as described with reference to FIGS. 5 through 8.

At 1710, the UE may identify, based on the measurement configuration, a measurement restriction parameter that indicates a number of time durations over which the UE is configured to measure for estimating the one or more Doppler shift parameters, where each time duration of the number of time durations includes a set of the set of reference signals. The operations of 1710 may be performed according to the methods described herein. In some examples, aspects of the operations of 1710 may be performed by a measurement restriction identification component as described with reference to FIGS. 5 through 8.

At 1715, the UE may transmit a measurement report indicating an estimated one or more Doppler shift parameters associated with the set of reference signals to the one or more nodes in accordance with the measurement restriction parameter. The operations of 1715 may be performed according to the methods described herein. In some examples, aspects of the operations of 1715 may be performed by a measurement report transmitter as described with reference to FIGS. 5 through 8.

At 1720, the UE may identify a time-domain overlap between a first channel state information report including the measurement report and a second channel state information report. The operations of 1720 may be performed according to the methods described herein. In some examples, aspects of the operations of 1720 may be performed by a collision identification component as described with reference to FIGS. 5 through 8.

At 1725, the UE may determine a prioritization for the first channel state information report and the second channel state information report based on a composition of the first channel state information report and a composition of the second channel state information report. The operations of 1725 may be performed according to the methods described herein. In some examples, aspects of the operations of 1725 may be performed by a prioritization component as described with reference to FIGS. 5 through 8.

Figure 18:
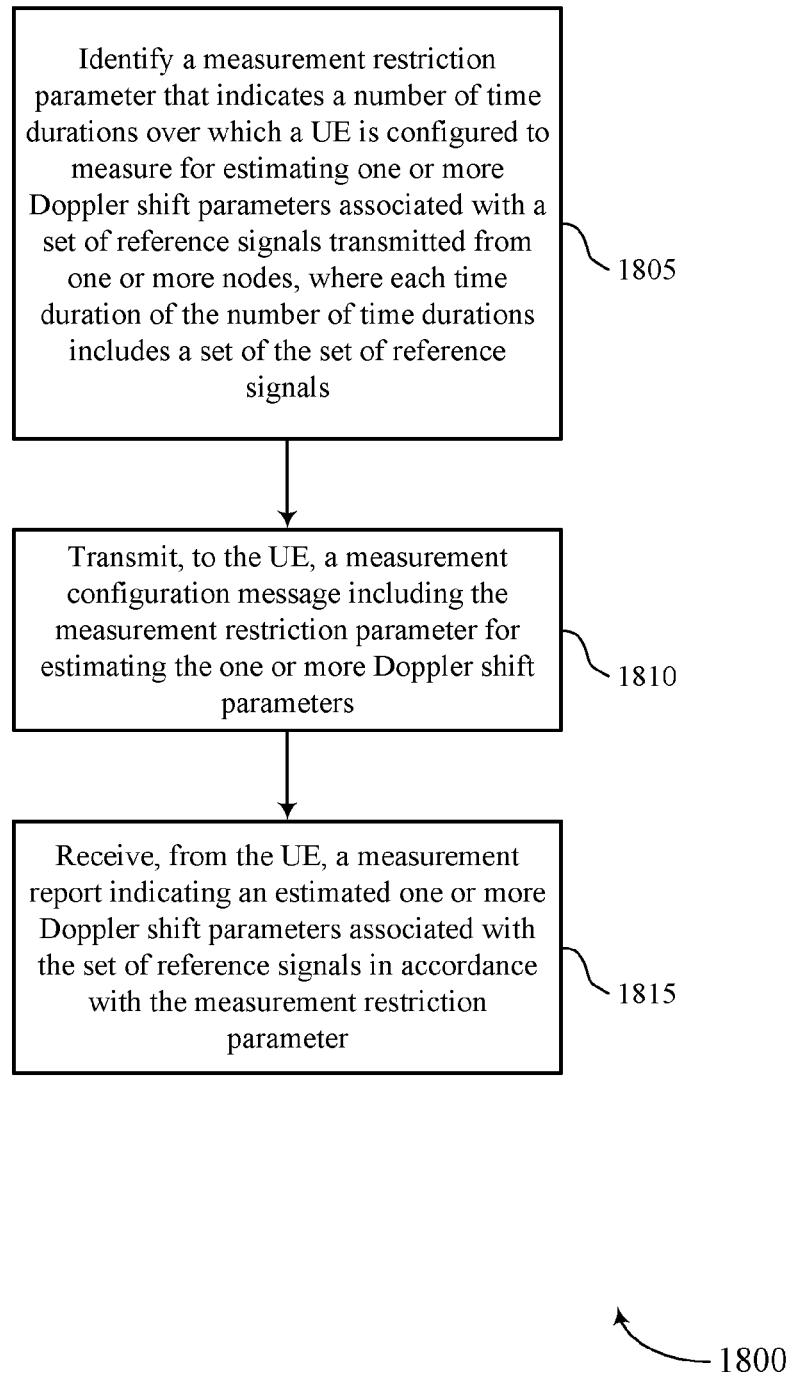

FIG. 18 shows a flowchart illustrating a method 1800 that supports measurement configuration for Doppler shift reporting in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a measurement restriction parameter that indicates a number of time durations over which a UE is configured to measure for estimating one or more Doppler shift parameters associated with a set of reference signals transmitted from one or more nodes, where each time duration of the number of time durations includes a set of the set of reference signals. The operations of 1805 may be performed according to the methods described herein. In some examples, aspects of the operations of 1805 may be performed by a measurement restriction identification component as described with reference to FIGS. 9 through 12.

At 1810, the base station may transmit, to the UE, a measurement configuration message including the measurement restriction parameter for estimating the one or more Doppler shift parameters. The operations of 1810 may be performed according to the methods described herein. In some examples, aspects of the operations of 1810 may be performed by a measurement configuration transmitter as described with reference to FIGS. 9 through 12.

At 1815, the base station may receive, from the UE, a measurement report indicating an estimated one or more Doppler shift parameters associated with the set of reference signals in accordance with the measurement restriction parameter. The operations of 1815 may be performed according to the methods described herein. In some examples, aspects of the operations of 1815 may be performed by a measurement report receiver as described with reference to FIGS. 9 through 12.

The following provides an overview of aspects of the present disclosure:

Aspect 1: A method for wireless communications at a UE, comprising: receiving a measurement configuration for estimating one or more Doppler shift parameters associated with a set of reference signals transmitted from one or more nodes; identifying, based on the measurement configuration, a measurement restriction parameter that indicates a number of time durations over which the UE is configured to measure for estimating the one or more Doppler shift parameters, wherein each time duration of the number of time durations comprises a plurality of the set of reference signals; and transmitting a measurement report indicating an estimated one or more Doppler shift parameters associated with the set of reference signals to the one or more nodes in accordance with the measurement restriction parameter.

Aspect 2: The method of aspect 1, further comprising: identifying a measurement accuracy for estimating the one or more Doppler shift parameters, wherein the measurement accuracy is based at least in part on the measurement restriction parameter.

Aspect 3: The method of aspect 2, wherein identifying the measurement accuracy further comprises: determining the measurement restriction parameter indicates a number of time durations, wherein the measurement accuracy is based at least in part on whether the number of time durations comprises more than a single time duration.

Aspect 4: The method of any of aspects 1 through 3, further comprising: identifying a measurement accuracy for estimating the one or more Doppler shift parameters based at least in part on a transmission timing structure for the set of reference signals.

Aspect 5: The method of any of aspects 1 through 4, further comprising: identifying a measurement accuracy for estimating the one or more Doppler shift parameters based at least in part on a reference signal type associated with the set of reference signals.

Aspect 6: The method of any of aspects 1 through 5, further comprising: determining the number of time durations comprises a single time duration corresponding to a single configured group of the set of reference signals; and determining the estimated one or more Doppler shift parameters based at least in part on a measurement over the single time duration of a Doppler shift associated with the single configured group of the set of reference signals.

Aspect 7: The method of any of aspects 1 through 6, further comprising: determining the number of time durations comprises a set of multiple time durations corresponding to a plurality of configured groups of the set of reference signals; estimating a Doppler shift value based at least in part on a measurement over each time duration of the set of multiple time durations; and determining the estimated one or more Doppler shift parameters based at least in part on averaging Doppler shift values associated with the set of multiple time durations.

Aspect 8: The method of any of aspects 1 through 7, wherein the measurement restriction parameter indicates one or more slots over which the UE is configured to measure for estimating the one or more Doppler shift parameters.

Aspect 9: The method of any of aspects 1 through 8, further comprising: identifying a range of resolvable Doppler shift values; and estimating the one or more Doppler shift parameters in accordance with the range of resolvable Doppler shift values.

Aspect 10: The method of aspect 9, wherein identifying the range of resolvable Doppler shift values further comprises: identifying a time-domain gap between consecutive samples of the set of reference signals.

Aspect 11: The method of any of aspects 9 through 10, wherein identifying the range of resolvable Doppler shift values further comprises: receiving a downlink message that indicates the range of resolvable Doppler shift values.

Aspect 12: The method of any of aspects 9 through 11, further comprising: generating the measurement report comprising a first indication of the estimated one or more Doppler shift parameters and a second indication of the range of resolvable Doppler shift values.

Aspect 13: The method of any of aspects 9 through 12, further comprising: identifying a number of bits allocated for reporting the one or more Doppler shift parameters; and determining a granularity for reporting the one or more Doppler shift parameters based at least in part on the range of resolvable Doppler shift values and the number of bits.

Aspect 14: The method of any of aspects 9 through 13, further comprising: determining a granularity for reporting the one or more Doppler shift parameters based at least in part on the number of time durations over which the UE is configured to use for estimating the one or more Doppler shift parameters.

Aspect 15: The method of any of aspects 1 through 14, wherein transmitting the measurement report further comprises: identifying a set of bins associated with one or more Doppler shift values; identifying a numerical value representative of the estimated one or more Doppler shift parameters; and allocating the estimated one or more Doppler shift parameters to a bin of the set of bins based at least in part on the numerical value.

Aspect 16: The method of aspect 15, further comprising: determining the set of bins comprises a first bin associated with Doppler shift values that are less than a threshold value, and a second bin associated with Doppler shift values that exceed the threshold value.

Aspect 17: The method of any of aspects 15 through 16, wherein the estimated one or more Doppler shift parameters are quantized based at least in part on the numerical value.

Aspect 18: The method of any of aspects 1 through 17, wherein transmitting the measurement report further comprises: generating a bit that indicates the estimated one or more Doppler shift parameters as having a positive or negative value.

Aspect 19: The method of any of aspects 1 through 18, further comprising: identifying a time-domain overlap between a first channel state information report comprising the measurement report and a second channel state information report; and determining a prioritization for the first channel state information report and the second channel state information report based at least in part on a composition of the first channel state information report and a composition of the second channel state information report.

Aspect 20: The method of aspect 19, wherein the composition comprises at least one of beam reporting information, Doppler reporting information, or channel quality information reporting.

Aspect 21: The method of any of aspects 19 through 20, wherein the prioritization is further based at least in part on a reference signal identifier, a control resource set identifier, or a quasi-co location information identifier associated with the measurement report.

Aspect 22: The method of any of aspects 1 through 21, wherein the number of time durations correspond to allocated time for monitoring a group of configured reference signals.

Aspect 23: The method of any of aspects 1 through 22, wherein the number of time durations comprise one or more slots.

Aspect 24: The method of any of aspects 1 through 23, wherein transmitting the measurement report to the one or more nodes further comprises: generating a first indicator associated with a first Doppler shift estimation parameter for a first transmission reception point (TRP); generating second indicator associated with a second Doppler shift estimation parameter for a second TRP; and transmitting the measurement report comprising the first indicator and the first Doppler shift estimation parameter and the second indicator and the second Doppler shift estimation parameter.

Aspect 25: The method of aspect 24, wherein the first indicator and the second indicator comprise different control resource set pool indices or transmission configuration indicator states.

Aspect 26: A method for wireless communications at a base station, comprising: identifying a measurement restriction parameter that indicates a number of time durations over which a UE is configured to measure for estimating one or more Doppler shift parameters associated with a set of reference signals transmitted from one or more nodes, wherein each time duration of the number of time durations comprises a plurality of the set of reference signals; transmitting, to the UE, a measurement configuration message comprising the measurement restriction parameter for estimating the one or more Doppler shift parameters; and receiving, from the UE, a measurement report indicating an estimated one or more Doppler shift parameters associated with the set of reference signals in accordance with the measurement restriction parameter.

Aspect 27: The method of aspect 26, further comprising: identifying a measurement accuracy for estimating the one or more Doppler shift parameters, wherein the measurement accuracy is based at least in part on the measurement restriction parameter.

Aspect 28: The method of aspect 27, wherein identifying the measurement accuracy further comprises: determining the measurement restriction parameter indicates a number of time durations, wherein the measurement accuracy is based at least in part on whether the number of time durations comprises more than a single time duration.

Aspect 29: The method of any of aspects 26 through 28, further comprising: identifying a measurement accuracy for estimating the one or more Doppler shift parameters based at least in part on a transmission timing structure for the set of reference signals.

Aspect 30: The method of any of aspects 26 through 29, further comprising: identifying a measurement accuracy for estimating the one or more Doppler shift parameters based at least in part on a reference signal type associated with the set of reference signals.

Aspect 31: The method of any of aspects 26 through 30, further comprising: determining the number of time durations comprises a single time duration corresponding to a single configured group of the set of reference signals, wherein the measurement report is based at least in part on a measurement over the single time duration of the one or more Doppler shift parameters associated with the single configured group of the set of reference signals.

Aspect 32: The method of any of aspects 26 through 31, further comprising: determining the number of time durations comprises a set of multiple time durations corresponding to a plurality of configured groups of the set of reference signals, wherein the measurement report comprises a Doppler shift value that is estimated based at least in part on an average measurement over each time duration of the set of multiple time durations.

Aspect 33: The method of any of aspects 26 through 32, wherein the measurement restriction parameter indicates one or more slots over which the UE is configured to measure for estimating the one or more Doppler shift parameters.

Aspect 34: The method of any of aspects 26 through 33, further comprising: identifying a time-domain overlap between a first channel state information report comprising the measurement report and a second channel state information report; and transmitting an indication of a prioritization for the first channel state information report and the second channel state information report based at least in part on a composition of the first channel state information report and a composition of the second channel state information report.

Aspect 35: The method of aspect 34, wherein the composition comprises at least one of beam reporting information, Doppler reporting information, or channel quality information reporting.

Aspect 36: The method of any of aspects 34 through 35, wherein the prioritization is further based at least in part on a reference signal identifier, a control resource set identifier, or a quasi-co location information identifier associated with the measurement report.

Aspect 37: The method of any of aspects 26 through 36, wherein the number of time durations correspond to allocated time for monitoring a group of configured reference signals.

Aspect 38: The method of any of aspects 26 through 37, wherein the number of time durations comprise one or more slots.

Aspect 39: An apparatus for wireless communications at a UE, comprising a processor; memory coupled with the processor; and instructions stored in the memory and executable by the processor to cause the apparatus to perform a method of any of aspects 1 through 25.

Aspect 40: An apparatus for wireless communications at a UE, comprising at least one means for performing a method of any of aspects 1 through 25.

Aspect 41: A non-transitory computer-readable medium storing code for wireless communications at a UE, the code comprising instructions executable by a processor to perform a method of any of aspects 1 through 25.

Aspect 42: An apparatus for wireless communications at a base station, comprising a processor; memory coupled with the processor; and instructions stored in the memory and executable by the processor to cause the apparatus to perform a method of any of aspects 26 through 38.

Aspect 43: An apparatus for wireless communications at a base station, comprising at least one means for performing a method of any of aspects 26 through 38.

Aspect 44: A non-transitory computer-readable medium storing code for wireless communications at a base station, the code comprising instructions executable by a processor to perform a method of any of aspects 26 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a measurement configuration for estimating one or more Doppler shift parameters associated with a set of reference signals transmitted from one or more nodes;
   identifying, based on the measurement configuration, a measurement restriction parameter that indicates a number of time durations over which the UE is configured to measure for estimating the one or more Doppler shift parameters, wherein each time duration of the number of time durations comprises a plurality of the set of reference signals; and
   transmitting a measurement report indicating an estimated one or more Doppler shift parameters associated with the set of reference signals to the one or more nodes in accordance with the measurement restriction parameter.

2. The method of claim 1, further comprising:
   identifying a measurement accuracy for estimating the one or more Doppler shift parameters, wherein the measurement accuracy is based at least in part on the measurement restriction parameter.

3. The method of claim 2, wherein identifying the measurement accuracy further comprises:
   determining the measurement restriction parameter indicates a number of time durations, wherein the measurement accuracy is based at least in part on whether the number of time durations comprises more than a single time duration.

4. The method of claim 1, further comprising:
   identifying a measurement accuracy for estimating the one or more Doppler shift parameters based at least in part on a transmission timing structure for the set of reference signals.

5. The method of claim 1, further comprising:
   identifying a measurement accuracy for estimating the one or more Doppler shift parameters based at least in part on a reference signal type associated with the set of reference signals.

6. The method of claim 1, further comprising:
   determining the number of time durations comprises a single time duration corresponding to a single configured group of the set of reference signals; and
   determining the estimated one or more Doppler shift parameters based at least in part on a measurement over the single time duration of a Doppler shift associated with the single configured group of the set of reference signals.

7. The method of claim 1, further comprising:
   determining the number of time durations comprises a set of multiple time durations corresponding to a plurality of configured groups of the set of reference signals;
   estimating a Doppler shift value based at least in part on a measurement over each time duration of the set of multiple time durations; and
   determining the estimated one or more Doppler shift parameters based at least in part on averaging Doppler shift values associated with the set of multiple time durations.

8. The method of claim 1, wherein the measurement restriction parameter indicates one or more slots over which the UE is configured to measure for estimating the one or more Doppler shift parameters.

9. The method of claim 1, further comprising:
   identifying a range of resolvable Doppler shift values; and
   estimating the one or more Doppler shift parameters in accordance with the range of resolvable Doppler shift values.

10. The method of claim 9, wherein identifying the range of resolvable Doppler shift values further comprises:
    identifying a time-domain gap between consecutive samples of the set of reference signals.

11. The method of claim 9, wherein identifying the range of resolvable Doppler shift values further comprises:
receiving a downlink message that indicates the range of resolvable Doppler shift values.

12. The method of claim 9, further comprising:
generating the measurement report comprising a first indication of the estimated one or more Doppler shift parameters and a second indication of the range of resolvable Doppler shift values.

13. The method of claim 9, further comprising:
identifying a number of bits allocated for reporting the one or more Doppler shift parameters; and
determining a granularity for reporting the one or more Doppler shift parameters based at least in part on the range of resolvable Doppler shift values and the number of bits.

14. The method of claim 9, further comprising:
determining a granularity for reporting the one or more Doppler shift parameters based at least in part on the number of time durations over which the UE is configured to use for estimating the one or more Doppler shift parameters.

15. The method of claim 1, wherein transmitting the measurement report further comprises:
identifying a set of bins associated with one or more Doppler shift values;
identifying a numerical value representative of the estimated one or more Doppler shift parameters; and
allocating the estimated one or more Doppler shift parameters to a bin of the set of bins based at least in part on the numerical value, wherein a first bin is associated with Doppler shift values that are less than a threshold value, and a second bin associated with different Doppler shift values that exceed the threshold value.

16. The method of claim 15, wherein the estimated one or more Doppler shift parameters are quantized based at least in part on the numerical value.

17. The method of claim 1, wherein transmitting the measurement report further comprises:
generating a bit that indicates the estimated one or more Doppler shift parameters as having a positive or negative value.

18. The method of claim 1, further comprising:
identifying a time-domain overlap between a first channel state information report comprising the measurement report and a second channel state information report; and
determining a prioritization for the first channel state information report and the second channel state information report based at least in part on a composition of the first channel state information report and a composition of the second channel state information report.

19. The method of claim 18, wherein the composition comprises at least one of beam reporting information, Doppler reporting information, or channel quality information reporting.

20. The method of claim 18, wherein the prioritization is further based at least in part on a reference signal identifier, a control resource set identifier, or a quasi-co location information identifier associated with the measurement report.

21. The method of claim 1, wherein the number of time durations correspond to one or more slots for monitoring a group of configured reference signals.

22. The method of claim 1, wherein transmitting the measurement report to the one or more nodes further comprises:
generating a first indicator associated with a first Doppler shift estimation parameter for a first transmission reception point (TRP);
generating a second indicator associated with a second Doppler shift estimation parameter for a second TRP; and
transmitting the measurement report comprising the first indicator and the first Doppler shift estimation parameter and the second indicator and the second Doppler shift estimation parameter.

23. The method of claim 22, wherein the first indicator and the second indicator comprise different control resource set pool indices or transmission configuration indicator states.

24. A method for wireless communications at a base station, comprising:
identifying a measurement restriction parameter that indicates a number of time durations over which a user equipment (UE) is configured to measure for estimating one or more Doppler shift parameters associated with a set of reference signals transmitted from one or more nodes, wherein each time duration of the number of time durations comprises a plurality of the set of reference signals;
transmitting, to the UE, a measurement configuration message comprising the measurement restriction parameter for estimating the one or more Doppler shift parameters; and
receiving, from the UE, a measurement report indicating an estimated one or more Doppler shift parameters associated with the set of reference signals in accordance with the measurement restriction parameter.

25. The method of claim 24, further comprising:
identifying a measurement accuracy for estimating the one or more Doppler shift parameters, wherein the measurement accuracy is based at least in part on whether the measurement restriction parameter comprises more than a single time duration.

26. The method of claim 24, further comprising:
identifying a measurement accuracy for estimating the one or more Doppler shift parameters based at least in part on a transmission timing structure for the set of reference signals or a reference signal type associated with the set of reference signals.

27. The method of claim 24, further comprising:
determining the number of time durations comprises a single time duration corresponding to a single configured group of the set of reference signals, wherein the measurement report is based at least in part on a measurement over the single time duration of the one or more Doppler shift parameters associated with the single configured group of the set of reference signals.

28. The method of claim 24, further comprising:
determining the number of time durations comprises a set of multiple time durations corresponding to a plurality of configured groups of the set of reference signals, wherein the measurement report comprises a Doppler shift value that is estimated based at least in part on an average measurement over each time duration of the set of multiple time durations.

29. An apparatus for wireless communications at a user equipment (UE), comprising:
a processor,
memory coupled with the processor; and
instructions stored in the memory and executable by the processor to cause the apparatus to:

receive a measurement configuration for estimating one or more Doppler shift parameters associated with a set of reference signals transmitted from one or more nodes;

identify, based on the measurement configuration, a measurement restriction parameter that indicates a number of time durations over which the UE is configured to measure for estimating the one or more Doppler shift parameters, wherein each time duration of the number of time durations comprises a plurality of the set of reference signals; and transmit a measurement report indicating an estimated one or more Doppler shift parameters associated with the set of reference signals to the one or more nodes in accordance with the measurement restriction parameter.

30. An apparatus for wireless communications at a base station, comprising:

a processor, memory coupled with the processor; and instructions stored in the memory and executable by the processor to cause the apparatus to:

identify a measurement restriction parameter that indicates a number of time durations over which a user equipment (UE) is configured to measure for estimating one or more Doppler shift parameters associated with a set of reference signals transmitted from one or more nodes, wherein each time duration of the number of time durations comprises a plurality of the set of reference signals;

transmit, to the UE, a measurement configuration message comprising the measurement restriction parameter for estimating the one or more Doppler shift parameters; and receive, from the UE, a measurement report indicating an estimated one or more Doppler shift parameters associated with the set of reference signals in accordance with the measurement restriction parameter.

* * * * *